(12) United States Patent
Kramarczyk et al.

(10) Patent No.: US 6,657,966 B1
(45) Date of Patent: *Dec. 2, 2003

(54) TEST ACCESS SYSTEM AND METHOD FOR DIGITAL CROSS CONNECT COMMUNICATION NETWORKS

(75) Inventors: Marian Kramarczyk, Suffern, NY (US); David Foni, Englewood, NJ (US); Haim Jacobson, Tenafly, NJ (US); Dobrin Tzotzkov, Ridgefield, NJ (US); Robert J. Koziy, Burnsville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/327,060

(22) Filed: Jun. 7, 1999

Related U.S. Application Data

(63) Continuation-in-part of application No. 09/219,269, filed on Dec. 23, 1998, now Pat. No. 6,493,319.

(51) Int. Cl.[7] ................................................. H04J 3/14
(52) U.S. Cl. ........................ 370/241; 370/419; 370/463
(58) Field of Search ................................. 370/241, 242, 370/243, 244, 245, 246, 249, 250, 419, 420, 421, 463; 379/15.01, 15.05, 16, 22, 22.01, 24, 26.01

(56) References Cited

U.S. PATENT DOCUMENTS 4,538,868 A    9/1985    Cruise et al.

(List continued on next page.)

FOREIGN PATENT DOCUMENTS

DE    3918144    12/1990

(List continued on next page.)

OTHER PUBLICATIONS http://www.adc.com/hadax/news/ds3.htm, XP002100334, "Hadax Electronics DS3 Access System Provides Immediate Problem Determination For DS3 Circuits", *Hadax In The News Press Releases 'Online*, 1 pg. (Apr. 1999).

(List continued on next page.)

*Primary Examiner*—Kenneth Vanderpuye
(74) *Attorney, Agent, or Firm*—Fogg and Associates, LLC

(57) ABSTRACT

A system and method for accessing a number of communication lines by one or more testing devices are disclosed. Each of the communications lines is coupled through the system and includes a first termination at a first telecommunications termination site and a second termination at a second telecommunications termination site. The system includes a number of line access devices, each of which is coupled to at least one of the communication lines terminating at the first telecommunications termination site and at least one of the communication lines terminating at the second telecommunications termination site. One or more monitoring busses are defined by a number of relays, one or more of which is coupled to one of the line access devices. A test device interface, which is selectively coupled to the bus, provides bi-directional connectivity between the selected communication line and a selected testing device coupled thereto. An activated one or more of the relays couples a selected one of the communication lines to a selected one of the testing devices via the test device interface. A single or multiple patch capability provides for manually establishing cross-connections between selected communication lines and for redirecting communication line connections to selected testing devices. The test access system and method accommodates various high speed digital transmission line protocols. The transmission lines coupled through the system may comprise high speed digital transmission lines characterized by transmission rates on the order of tens, hundreds or thousands of megabits per second (Mbps).

51 Claims, 21 Drawing Sheets

U.S. PATENT DOCUMENTS

| | | | |
|---|---|---|---|
| 4,611,101 A | * | 9/1986 | Walter |
| 4,663,776 A | * | 5/1987 | Wever et al. |
| 4,815,104 A | | 3/1989 | Williams et al. |
| 4,833,708 A | | 5/1989 | Goodrich |
| 4,840,568 A | | 6/1989 | Burroughs et al. |
| 4,845,736 A | | 7/1989 | Posner et al. |
| 4,901,004 A | | 2/1990 | King |
| 4,916,444 A | | 4/1990 | King |
| 4,968,929 A | | 11/1990 | Hauck et al. |
| 4,989,202 A | * | 1/1991 | Sota et al. |
| 4,998,240 A | * | 3/1991 | Williams |
| 5,052,940 A | | 10/1991 | Bengal |
| 5,107,532 A | | 4/1992 | Hansen et al. |
| 5,161,988 A | | 11/1992 | Krupka |
| 5,166,970 A | | 11/1992 | Ward |
| 5,195,902 A | | 3/1993 | Bengal |
| 5,325,361 A | | 6/1994 | Lederer et al. |
| 5,343,461 A | | 8/1994 | Barton et al. |
| 5,394,503 A | | 2/1995 | Dietz, Jr. et al. |
| 5,432,847 A | | 7/1995 | Hill et al. |
| 5,483,467 A | | 1/1996 | Krupka et al. |
| 5,523,747 A | | 6/1996 | Wise |
| 5,546,282 A | | 8/1996 | Hill et al. |
| 5,594,347 A | | 1/1997 | Louwagie et al. |
| 5,631,902 A | | 5/1997 | Yoshifuji |
| 5,715,474 A | | 2/1998 | Burke et al. |
| 5,761,272 A | | 6/1998 | Williams et al. |
| 5,831,979 A | | 11/1998 | Byers |
| 5,920,608 A | | 7/1999 | Minegishi |
| 5,982,744 A | | 11/1999 | Cantwell et al. |
| 6,259,676 B1 | | 7/2001 | Kellock et al. |
| 6,333,931 B1 | | 12/2001 | LaPier et al. |
| 6,438,226 B1 | | 8/2002 | Guenther et al. |
| 6,453,014 B1 | | 9/2002 | Jacobson et al. |
| 6,493,319 B1 | | 12/2002 | Kramarczyk et al. |

FOREIGN PATENT DOCUMENTS

| | | |
|---|---|---|
| EP | 317852 A2 | 5/1989 |
| EP | 383931 A1 | 8/1990 |
| EP | 687115 A2 A1 | 12/1995 |
| EP | 0 700 193 | 3/1996 |
| EP | 0 814 620 A2 | 12/1997 |
| EP | 0 891 067 A2 | 1/1999 |
| EP | 0 909 102 A2 | 4/1999 |
| GB | 2236398 A | 4/1991 |
| WO | WO 98/03022 | 1/1998 |
| WO | WO 99/34549 | 7/1999 |
| WO | WO 99/53643 | 10/1999 |

OTHER PUBLICATIONS

Brochure, Access Systems DS1/DS3, Series 2004/2005, Hadax Electronics, Inc., South Hackensack, NJ (1996).

Brochure, Access Systems DS1, Series 2004, Hadax Electronics, Inc., South Hackensack, NJ (1997).

Brochure, Access Systems DS3, Series 2005, Hadax Electronics, Inc., South Hackensack, NJ (1997).

American National Standard for Telecommunications–Digital Hierarchy–Layer 1 In–Service Digital Transmission Performance Monitoring, American National Standards Institute, Inc., New York, approved Sep. 16, 1993.

Shah et al. *Technology: Telecom Equipment–Wireline*, The DSL Equipment Report, U.S. Investment Research, Morgan Stanley Dean Witter, Sep. 28, 1999, pp. 1–26.

"Network Surveillance Test and Reconfiguration (NetStar). RTM Remote Test Unit (RTU) User Manual", Hardware Description (TL1 Language) Installation Maintenance General Information, ADC Telecommunication, Inc., ADCP–66–301, $2^{nd}$ Edition, Issue 1, Feb. 1991.

* cited by examiner

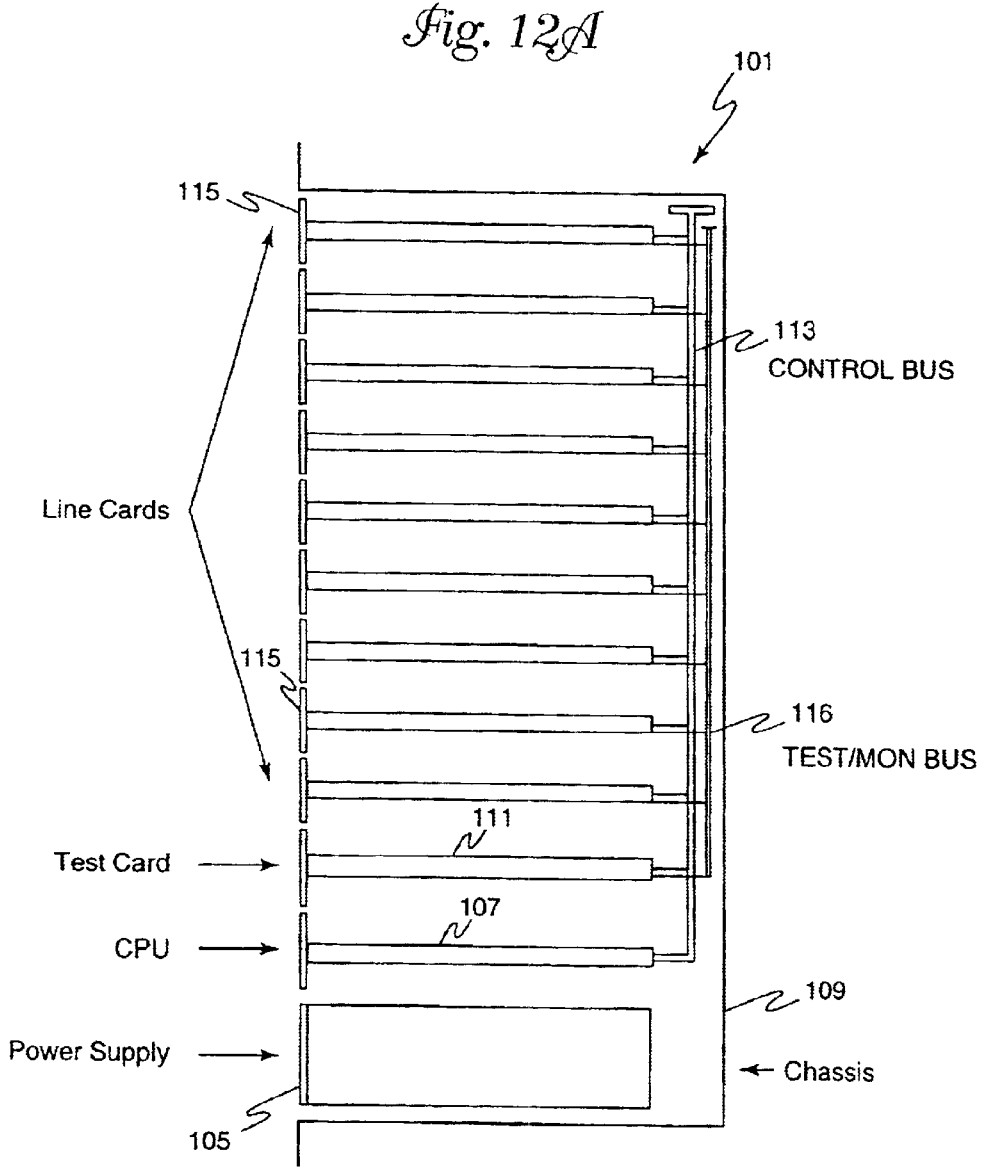

TEST ACCESS SYSTEM AND METHOD FOR DIGITAL CROSS CONNECT COMMUNICATION NETWORKS

RELATED APPLICATIONS

This application is a continuation-in-part of U.S. Ser. No. 09/219,269, filed Dec. 23, 1998 U.S. Pat. No. 6,493,319, which is hereby incorporated herein in its entirety.

FIELD OF THE INVENTION

The present invention relates generally to communication line testing systems and, more specifically, relates to a testing system and method which provides for selective connection of testing equipment to any of a plurality of high speed digital communication lines and for establishing cross-connections between selected communication lines through manual cross-connection patch access.

BACKGROUND OF THE INVENTION

The term DS-1 refers to a telecommunications protocol standard for digital transmission used extensively in the United States. The DS-1 standard provides a transmission link with a capacity of 1.544 megabits per second (Mbps) over a twisted wire pair. With this capacity, a DS-1 link can handle the equivalent of 24 voice conversations, each digitized at 64 kilobits per second (Kbps). However, with the ever increasing demands that modern technology and the information super highway places upon the communications industry, increasing bandwidth is being demanded. In response to such demand, faster communication links, such as DS-3 transmission links, are being deployed to meet these demands. A conventional DS-3 link provides the equivalent of 28 DS-1 links or a capacity of 44.736 Mbps, which is the equivalent of 672 voice conversations. A DS-3 line typically runs on fiber optic, microwave radio, or coaxial cable lines.

The signaling protocol for DS-3 systems, commonly referred to as DS-3 signaling, involves pulses which require a bandwidth comparable to VHF (very high frequency) radio waves. At these frequencies, providing switchable access between communication links and test equipment can become problematic, because of the need to ensure signal integrity as the DS-3 pulses propagate through the system. For example, at the circuit level, solid state switching devices are no longer effective to make switchable connections, owing to the high frequency parasitic circuit paths present in such devices. On the printed circuit board level, it becomes necessary for circuit paths to appear substantially as transmission lines, and any failure to do so, can result in substantial mismatches, reflections and other signal distortions, in addition to crosstalk, on the circuit board itself.

SUMMARY OF THE INVENTION

Broadly, it is an object of the present invention to provide a method and apparatus for switching a plurality of testing devices among a plurality of transmission links while preserving the integrity of the signal as it propagates through the system. It is specifically contemplated that all signal paths in the system exhibit the characteristics of a transmission line that provides for no appreciable attenuation or distortion of the signal and no appreciable crosstalk. It is a further object of the present invention to provide a method and apparatus for establishing cross-connections between selected transmission lines in addition to a capability of switching a plurality of testing devices among a plurality of transmission lines.

In accordance with one embodiment demonstrating objects, features and advantages of the present invention, there is provided a system for providing selective testing access to a plurality of communication signal lines by a plurality of testing devices. The system includes line access cards that provide an interface for plurality of high frequency signal lines and at least one test card that provides an interface for a plurality of high frequency testing devices. The cards plug into a motherboard, which provides selective connection between test devices and signal lines.

All high frequency signal paths on the cards and motherboard exhibit the characteristics of a transmission line with a predefined characteristic impedance, and transfer high frequency pulses with minimum attenuation, minimum distortion, and minimum crosstalk. Switching is provided on the motherboard by relays with low insertion loss and crosstalk. The relays are provided on the line access cards, test card, and motherboard. All signal paths represent straight point-to-point electrical circuits with no taps. The connections between the rear cards of the line access devices and the motherboard are provided by 96 pin DIN connectors, and represent the only part of this high frequency signal path in which impedance is not strictly controlled. However, the signal integrity through these connectors is maintained by implementing a connector pin assignment and configuration which simulates a co-axial transmission line.

In accordance with another embodiment demonstrating objects, features and advantages of the present invention, a system provides for selective testing access to a plurality of communication signal lines by a plurality of testing devices and, in addition, provides a manual patching capability through employment of line access cards which include single or multiple patch circuitry. A system according to this embodiment of the present invention combines the features and advantages of automatic remote controlled test access with the convenience and flexibility of manually establishing desired or needed cross-connections.

Each of the line access cards, according to this embodiment of the present invention, provides jack interface access to a corresponding communication line, such as a DS-3 transmission line. The line access cards may incorporate a single patching capability or a multiple patching capability, such as a dual patching capability. The line access cards according to this embodiment include a number of switching jacks that provide a user with manual and direct access to a multiplicity of communication lines or channels routed through line access cards. Each of the line access cards includes a monitor jack, an input jack, and an output jack for selectively patching communications lines to facility side, equipment side, and testing device terminations.

In accordance with another aspect of the present invention, bridging resistors may be coupled between selected communication lines passing through the test access system and one or more testing devices. The value of the bridging resistors is typically several times greater than the characteristic impedance of the communication line subject to testing so as to prevent the testing device from interfering with the normal data flow on the communication line. According to another aspect of the present invention, an amplifier may be coupled between each of the bridging resistors and the corresponding input of a testing device. The amplifiers may be configured to increase the gain of the signal subject to testing to a level equivalent to offset the attenuation resulting from inclusion of the bridging resistors in the test signal path.

BRIEF DESCRIPTION OF THE DRAWINGS

The foregoing, and other objects, features and advantages of the present invention will be more completely understood from a detailed description of the presently preferred embodiment with reference being had to the accompanying drawings, in which:

FIGS. 12A and 12B are depictions of an embodiment of a test access system of the present invention which incorporates a cross-connect capability using single or multiple patch circuitry provided in individual line access cards;

DETAILED DESCRIPTION OF VARIOUS EMBODIMENTS

Figure 1:
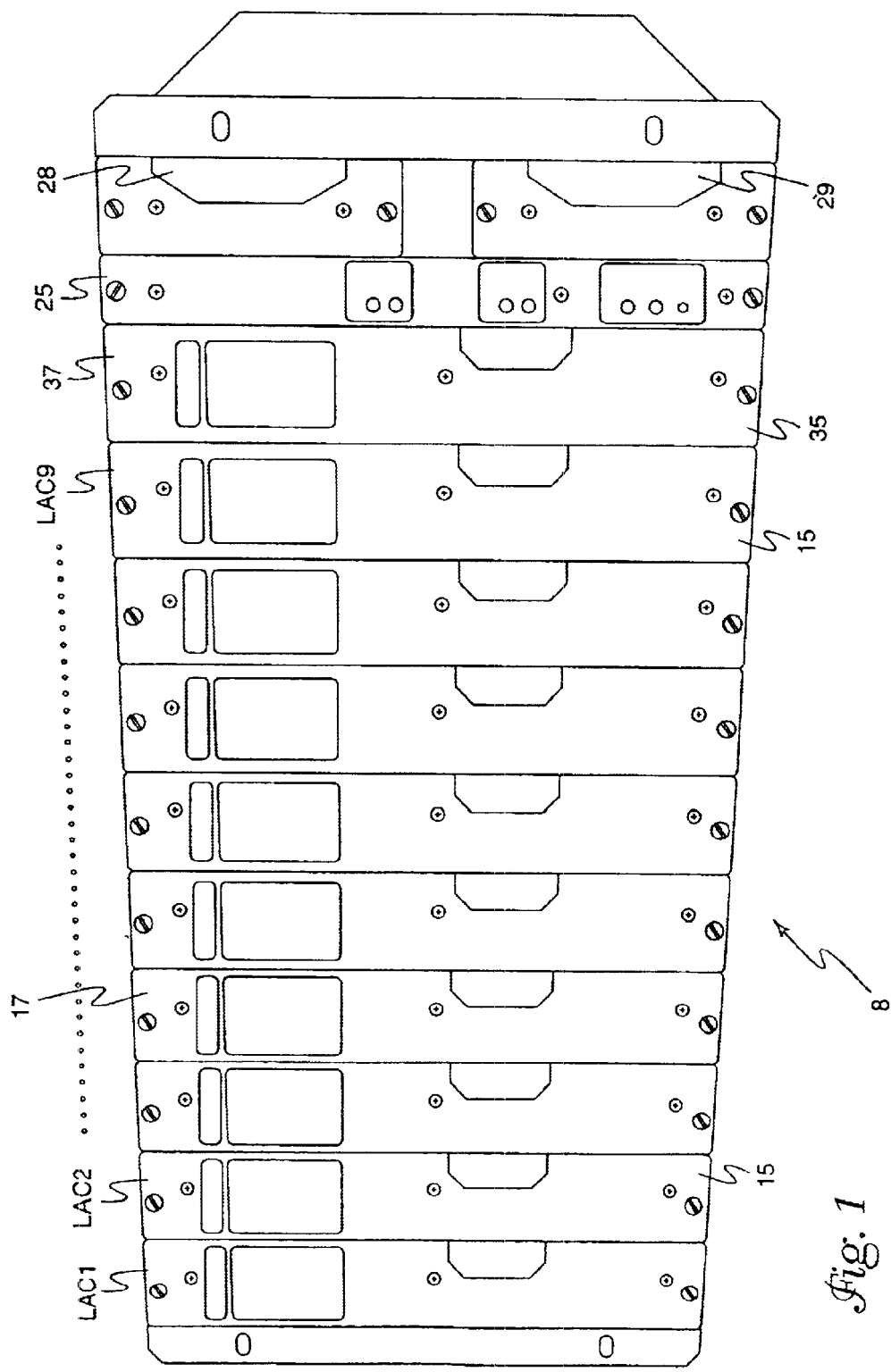
FIG. 1 is a front perspective view of a test access system in accordance with an embodiment of the present invention.
Figure 2:
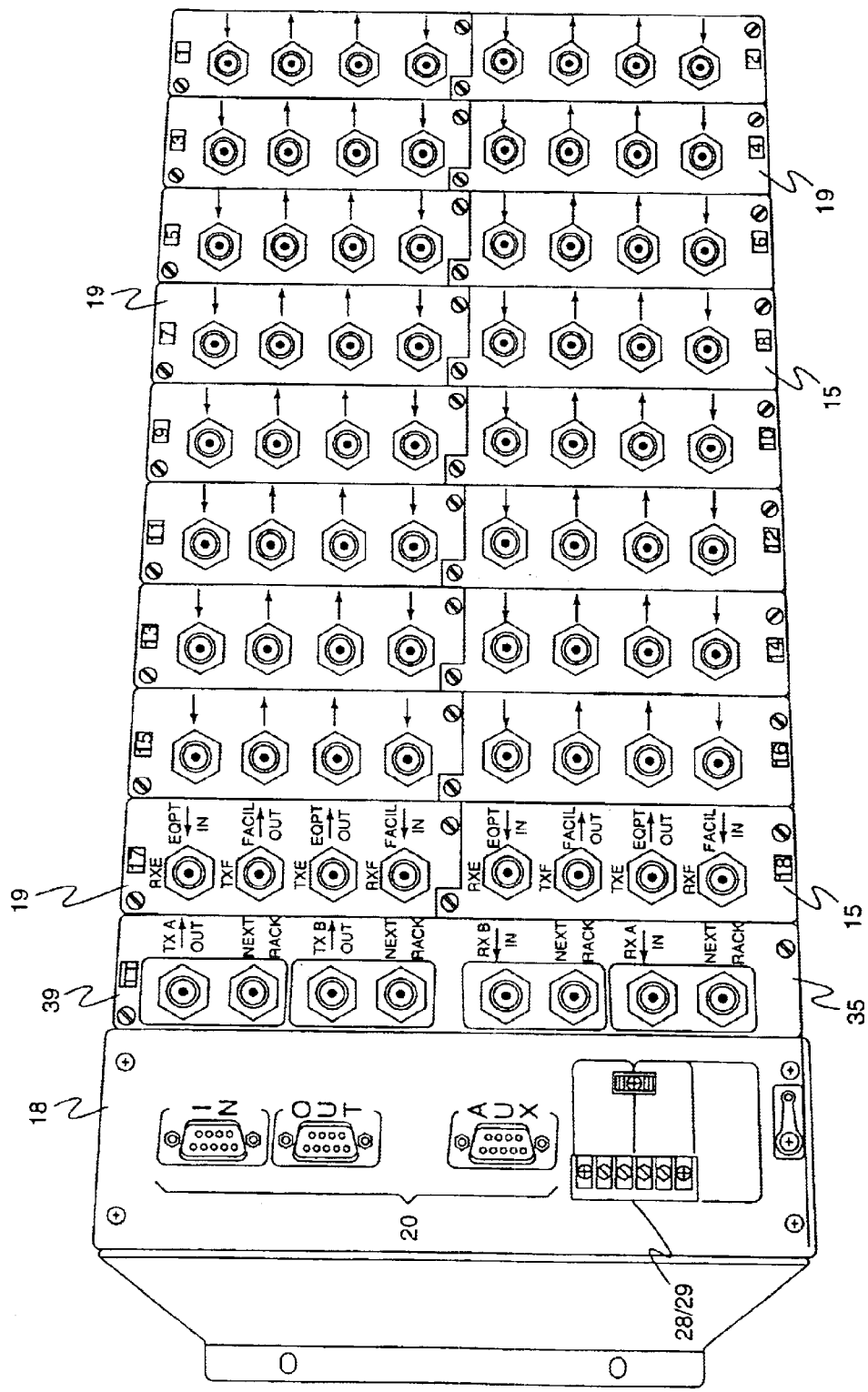
FIG. 2 is a rear perspective view of a test access system in accordance with an embodiment of the present invention.

Turning now to the drawings, FIGS. 1 and 2 are front and rear perspective views, respectively, of a test access system 8 embodying objects and features of the present invention. An embodiment of a system that operates in accordance with the principles of the present invention is available from ADC Telecommunications of South Hackensack, N.J. as the "2005 DS-3 Access System." Objects and features of the present invention will generally be described herein within the context of a telecommunications network conforming to a DS-3 transmission carrier standard, which is used in North America. It is understood that the systems and methods of the present invention are applicable for accessing and testing other types of transmission lines, including high speed digital transmission lines providing transmission rates on the order of tens, hundreds or thousands of megabits per second (Mbps).

As is best seen in FIGS. 1 and 2, the test access system 8 includes a number of line access cards 15, a test equipment card 35, a control card 25, and two power supplies 28, 29. Each of the line access cards 15, as can be seen in FIG. 2, includes a number of connectors for receiving corresponding connectors of a number of communication lines, such as DS-3 transmission lines. The test equipment card 35 includes a number of connectors that receive corresponding connectors of a number of testing devices. The control card 25, which includes a programmable processor or CPU, coordinates the activities of the test access system 8, and may further communicate with a remote controlling unit via a communications card 18.

Figure 3:
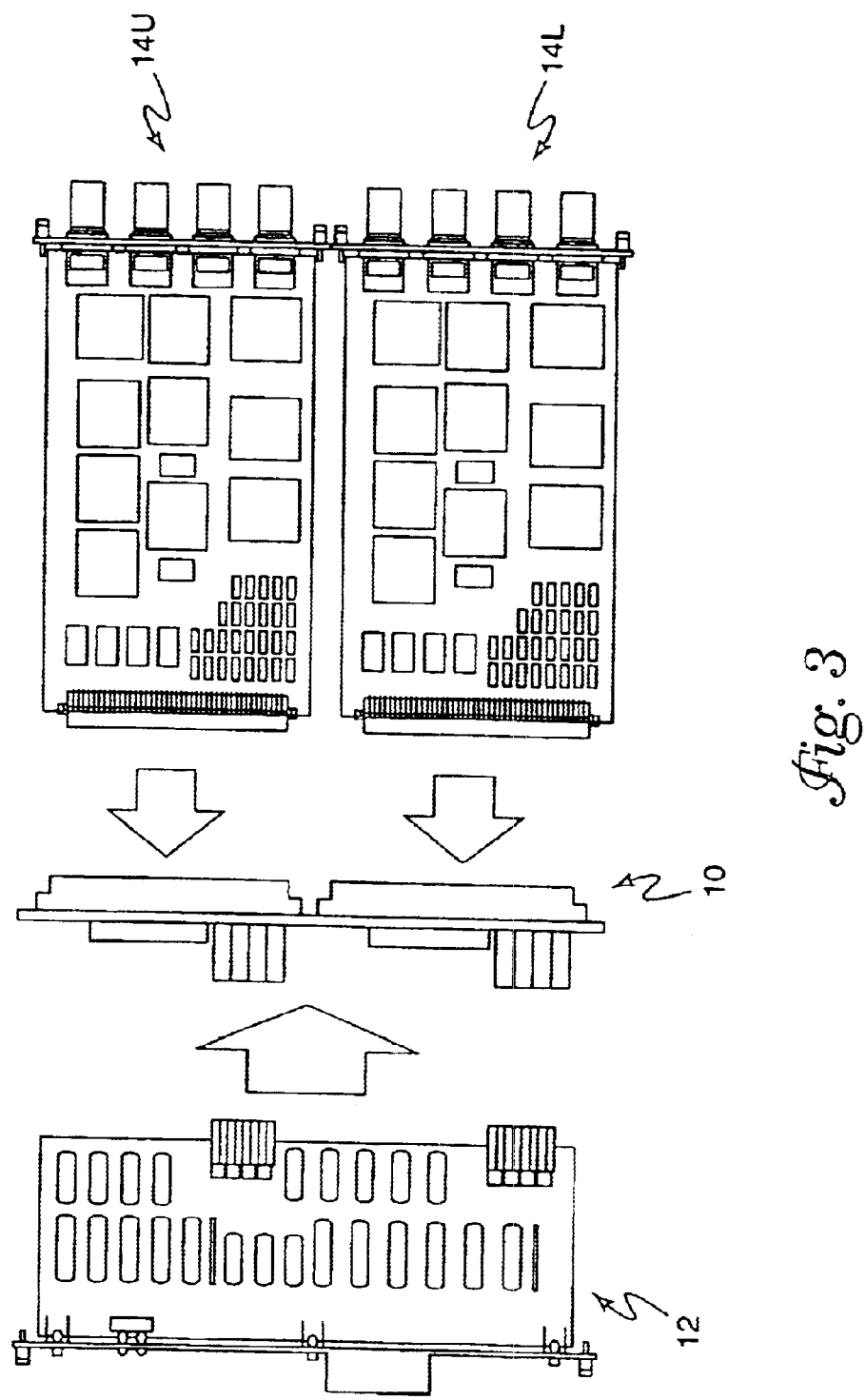
FIG. 3 is a side schematic view of the motherboard illustrating how front and rear cards of a line access module plug thereinto according to an embodiment of the present invention.

In accordance with a preferred embodiment of the present invention, and as is depicted in FIGS. 1 and 2, test access system 8 is designed to be modular and rack mountable. In accordance with this embodiment, test access system 8 includes nine line access cards 15, each of which comprises a front line card (FLC) 17 and a rear line card (RLC) 19. The test equipment card 35, according to this embodiment, comprises a front test card (FTC) 37 and a rear test card (RTC) 39. As is further seen in FIG. 3, the test access system 8 includes a double-sided motherboard 10, with front circuit cards 12 plugging into the front of the motherboard 10 and rear circuit cards 14U, 14L plugging into the rear of the motherboard 10. Rather than a single full-height circuit card, two half-height circuit cards may be provided, such as a top rear card 14U and a bottom rear card 14L as is illustrated in FIG. 3.

In this configuration, nine front line cards 17 plug into the front of motherboard 10. The rear of the motherboard 10 provides coupling for a bank of nine top rear line cards 19 (i.e., RLC1–RLC17, odd numbers only) and a bank of nine bottom rear line cards 19 (RLC2–RCL18, even numbers only), for a total of 18 line access cards 15. Also coupled to motherboard 10 is a single test equipment card 35, with the front test card 37 and rear test card 39 of test equipment card 35 being coupled to the front and rear of motherboard 10, respectively. The control card (CC) 25, communications card (COMC) 18, and each of the power supplies 28, 29 are also connected to the motherboard 10.

In operation, four conventional BNC connectors (RXE, RXF, TXE, TXF) provided on each line access card 15, and typically on rear line card 19 of each line access card 15, provide an interface connection for one bi-directional communication line, such as a DS-3 transmission line. Similarly, the BNC connectors (TXA, TXB, RXA, RXB) provided on the test equipment card 35, and typically on the rear test card 39 of the test equipment card 35, provide a dual test port, which permits two pieces of communication line test equipment to be connected thereto. The communication card 18 has an interface 20 which includes three connections that provide an RS-232 interface to and from the test access system 8. However, it will be appreciated that any other type of communication interface 20, such as a network interface 20, would work equally well.

In accordance with one embodiment of the present invention, the front line card 17 of each line access card 15 provides control to a pair of rear line cards 19. In accordance with this embodiment, the front test card 37 of the test equipment card 35 provides control to the rear test card 39. The front line cards 17 and the front test card 37 operate under control of the CPU provided in the control card 25.

Figure 4:
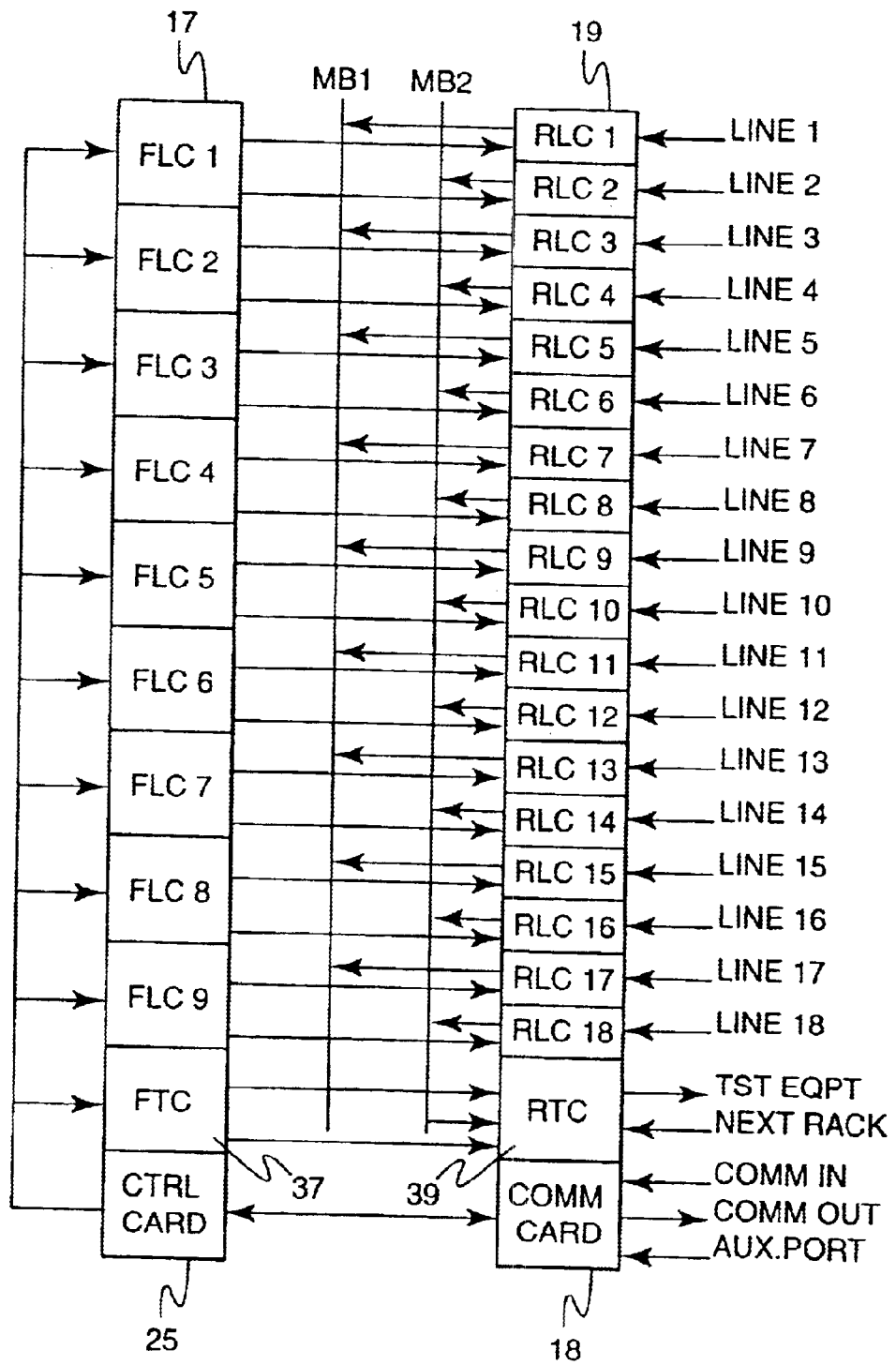
FIG. 4 is a functional block diagram illustrating the operation of a test access system in accordance with an embodiment of the present invention.

The block diagram of FIG. 4 illustrates how the various cards are interconnected through the motherboard 10, and the operation of the test access system 8 will best be understood by reference to that block diagram. A duplex communication line is connected to each of the 18 rear line cards 19 (i.e., RLC1 through RLC18). Two pieces of communication line test equipment are connected to the rear test card 39 (RTC) and are selectively connected to one of the 18 RLCs 19. This is achieved by means of two monitoring buses, MB1 and MB2. The RTC 39 is connected to both of the buses, MB1 and MB2, and each RLC 19 is connected to one of the two busses, MB1, MB2. In the embodiment illustrated in FIG. 4, the odd (upper) RLCs 19 are connected to MB1, and the even (lower) RLCs 19 are connected MB2. The details of making such connections will be discussed further below. At this point it is sufficient to note that the connection between one of the monitoring buses, MB1 or MB2, and an RLC 19 is made through one or more relays.

In accordance with the embodiment shown in FIG. 4, each pair of RLCs 19 which occupy a common slot (i.e., one upper and one lower RLC 19) is controlled by a corresponding front line card 17. The front test card (FTC) 37 of the test equipment card 35 controls the rear test card (RTC) 39. The FLCs 17 and FTC 37 are, in turn, controlled by the CPU provided in the control card (CC) 25. The control card 25 receives configuration commands from a controlling device, such as a terminal or personal computer via an RS-232 link provided through the communication card (COMC) 18. The communication card 18 can also provide outgoing information through one of its communication ports 20, such as status information provided by the control card 25. The use of the communication links makes it particularly efficient to perform remote testing.

An important aspect of a test access system 8 according to the present invention involves ensuring signal integrity as the communication signal pulses propagate through the test access system 8. To ensure a high level of signal transmission integrity, all signal paths within the test access system 8 are designed to exhibit the characteristics of an unbalanced transmission line with a 75 ohm characteristic impedance, capable of transferring communication signal pulses with minimum attenuation, minimum distortion, and minimum crosstalk. However, it will be appreciated that other impedance characteristics will work equally well, where appropriate.

Figure 10:
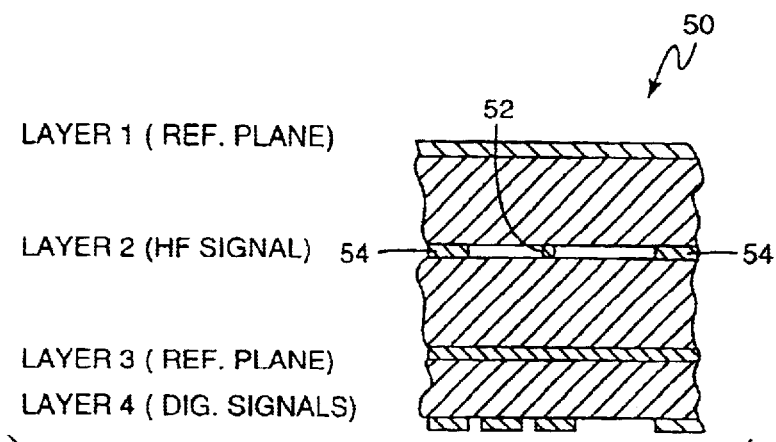
FIG. 10 is a fragmentary sectional view showing a portion of a circuit card as used in the preferred embodiment of the present invention.

In order to provide for such signal transmission integrity at the printed circuit board level, special layout techniques are employed. In accordance with one embodiment of the present invention, the cards of the test access system 8 which are involved in transferring information signals (e.g., the RLCs 19, the RTC 39, and the motherboard 10) are multilayered, impedance controlled printed circuit boards. A circuit board construction according to this embodiment is illustrated in FIG. 10, which shows a section of a circuit board 50 with four layers, layer 1 through layer 4. However, it will be appreciated that a six or greater layer board could be used.

All traces that transfer information signals are designed as unbalanced transmission lines with a 75 ohm characteristic impedance. The transmission lines have a stripline configuration, consisting of a signal conductor and two reference planes, one above and one below the signal conductor. For maximum electromagnetic induction (EMI) shielding, guard conductors are placed on either side of the signal conductors and surround every signal trace. The guard conductors are located on the signal layer of a printed circuit board and are connected to both reference planes at every half inch. Layers 1–3 depicted in FIG. 10 define the stripline configuration, with the high frequency (HF) signal path provided at layer 2 via conductor 52. The guard conductors 54, 54 are also provided in layer 2, on either side of signal conductor 52. Layer 4 is used for the relatively low speed logic (control) signals. The substrate material of the printed circuit board is preferably FR-4.

The components used in the test access system 8 are also selected to have a 75 ohm characteristic impedance and excellent frequency characteristics. Input and output connections for information signal paths are provided by 75 ohm BNC connectors mounted on the printed circuit board. Switching is provided by 75 ohm HF relays with low insertion loss and crosstalk. The connections between the rear cards (RLCs, RTC) 19, 39 and the motherboard 10 are provided by 96 pin DIN connectors. The DIN pin connector interface represents the only part of the information signal path in this embodiment in which impedance is not strictly controlled.

Figure 11:
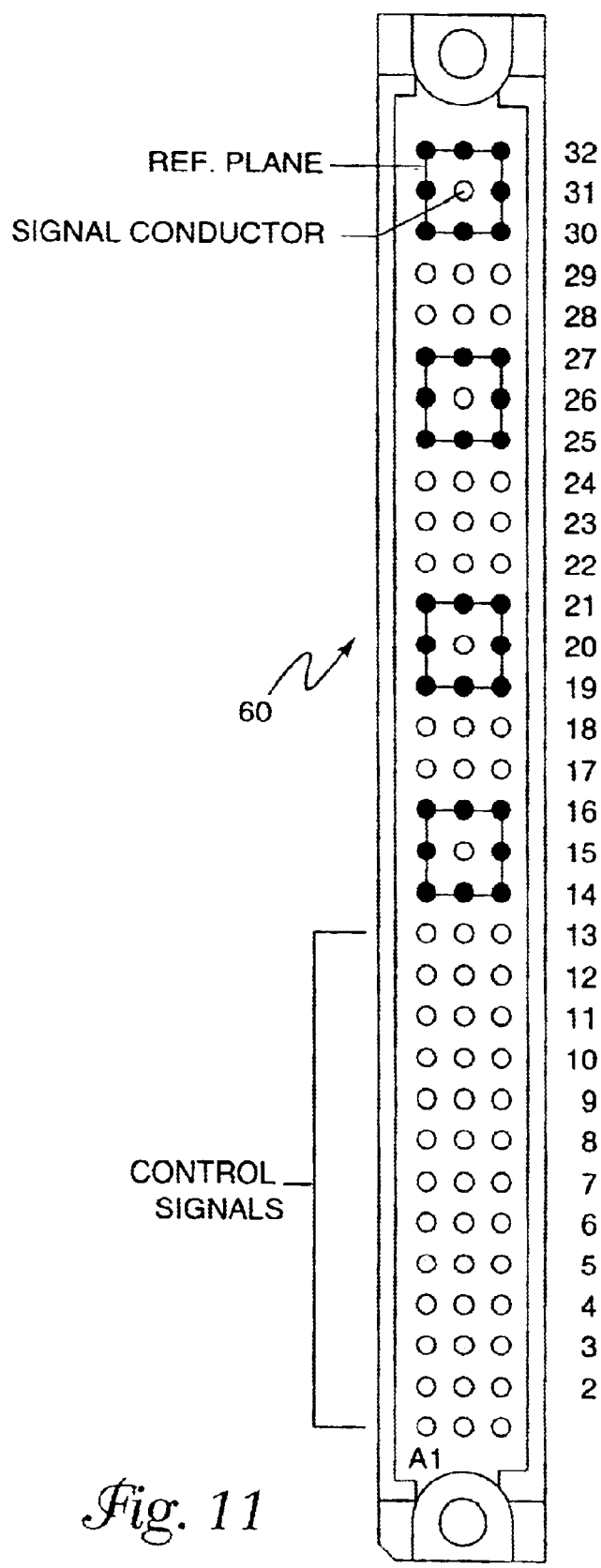
FIG. 11 is a schematic diagram illustrating a 96-pin connector as used in the preferred embodiment of the present invention with a pin arrangement designed to achieve an effective transmission line.

However, signal integrity through these connectors is maintained by using a pin assignment which simulates a co-axial transmission line, thus minimizing the discontinuity and making the connector effectively transparent to the propagating information signal. This pin assignment makes use of one pin from Column B (i.e., middle column of pins) of the connector as a signal conductor and all eight surrounding pins are used as shield conductors. A connector 60 incorporating such a pin configuration is illustrated in FIG. 11, wherein four separate pin groupings are shown. For example, the middle pin in row 31 is shown as connected to the signal conductor. At the same time, the remaining pins in rows 30–32 are connected together and to the ground plane.

From the point of view of the electrical circuit design, all signal paths are straight point-to-point electrical circuits with no taps. All junctions between different signal paths on the RLCs 19 and RTC 39 are made through relay contacts. On the RLCs 19, the "normal through" signal paths are tapped for monitoring through 750 ohm bridging resistors, which virtually eliminate any effect of the tapping circuits on the communication lines in monitoring modes. As was previously discussed, the RLCs 19 are connected to the monitoring busses, MB1 and MB2, through relays which are located on the motherboard 10 and controlled by the FLCs 17.

Figure 5:
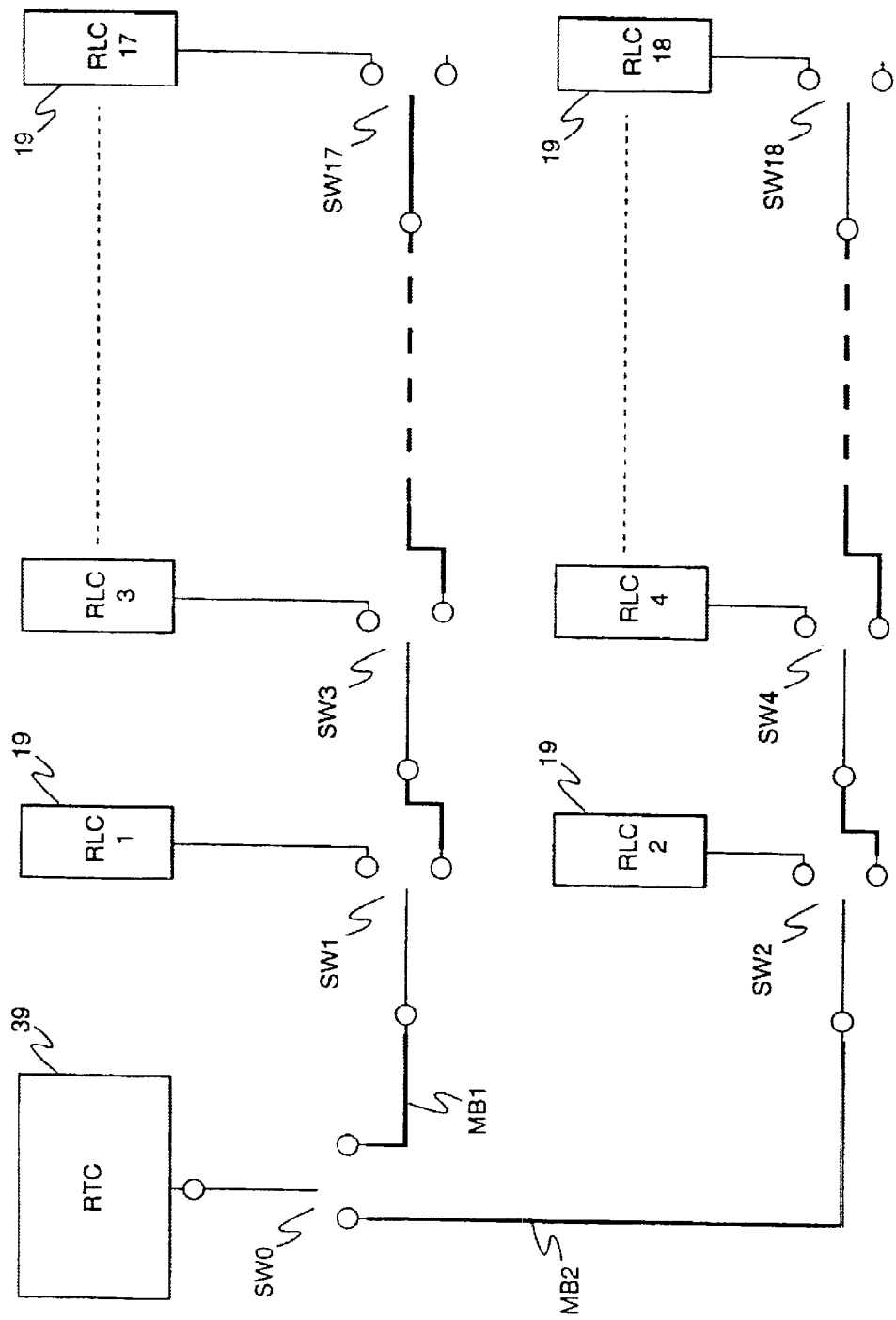
FIG. 5 is a functional block diagram of a test access system illustrating the architecture of the monitoring busses that permit switching access between the rear test card and the rear line card in accordance with an embodiment of the present invention.

FIG. 5 is a schematic block diagram useful in explaining how monitoring bus switching is achieved in a test access system 8 of the present invention so as to ensure signal integrity. FIG. 5 includes components which have already been shown and discussed with respect to FIG. 4, and these components are represented by similar reference characters. FIG. 5 illustrates, in particular, the relays, which are depicted as switches, which achieve monitoring bus switching. The RTC relays, SWO, which are part of the RTC 39 in one embodiment, are capable of connecting the RTC 39 to either MB1 or MB2, depending upon the position of SW0. With respect to the monitoring busses, MB1 and MB2, each RLC 19 includes a corresponding set of relays. By way of example, the upper (odd numbered) RLCs 19 are coupled to associated relay sets SW1–SW17. In each instance, these relays are normally in their downward position (i.e., when not energized).

When no RLC relays are energized, end-to-end continuity of each monitoring bus, MB1, MB2, is provided and no RLCs 19 are connected to the monitoring busses. The relays of the RLCs 19 are, however, activated one at a time, so as to place one of the RLCs 19 on the corresponding monitoring bus. When a set of relays are so energized for a particular RLC 19, the relays are essentially placed in the upward position with respect to the depiction of FIG. 5, which breaks the end-to-end continuity of the corresponding monitoring bus and connects the corresponding RLC 19 to that monitoring bus. The described construction of the motherboard 10 guarantees that, at any time, there is only a single point-to-point connection between the RTC 39 and the selected RLC 19, and no other RLCs 19 are attached to the monitoring bus. At the same time, that part of the monitoring bus which is not in use is disconnected and does not interfere with the propagation of the signal.

Figure 6:
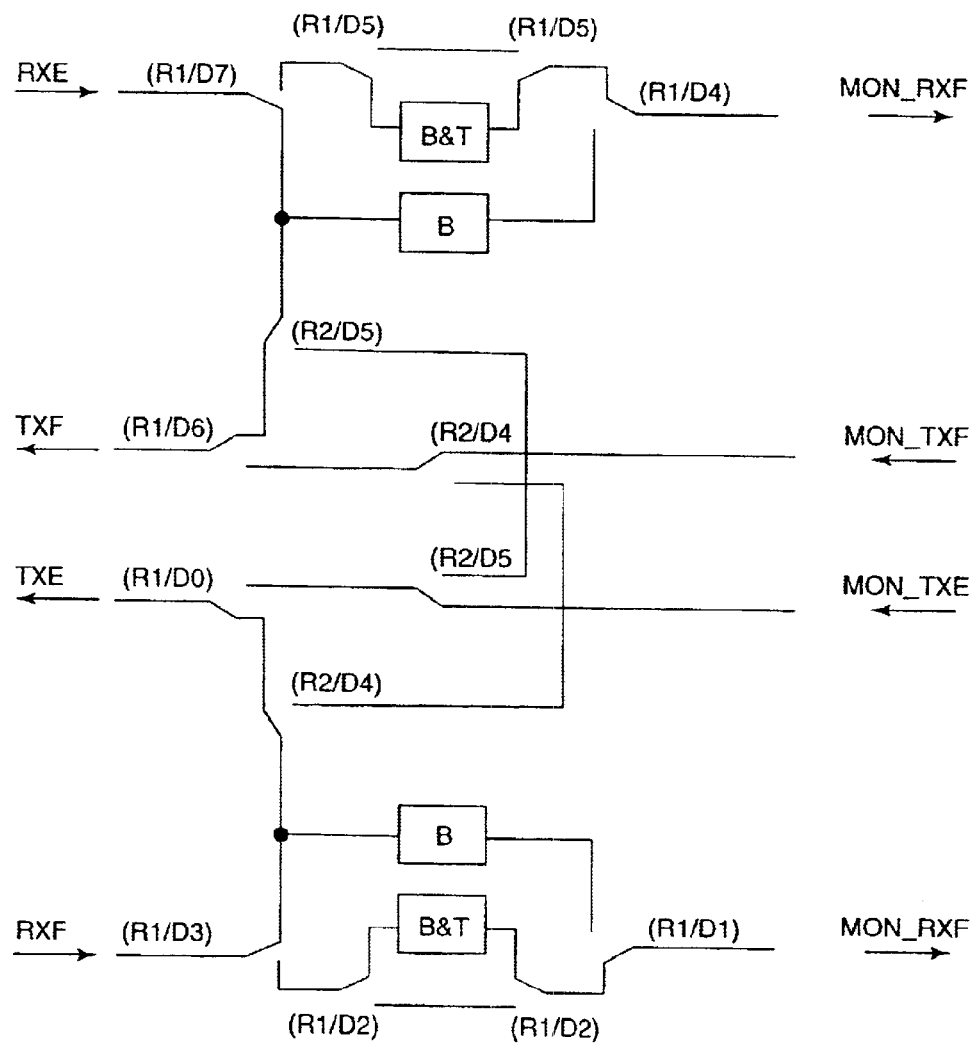
FIG. 6 is a schematic block diagram of a rear line card of a line access module in accordance with an embodiment of the present invention.

FIG. 6 is a schematic block diagram of a rear line card (RLC) 19 in accordance with an embodiment of the present invention. In general, RLC 19 includes two interfaces: one to the communication line and one to the motherboard 10. The interface to the communication line is provided by four BNC connectors. The interface to the motherboard 10 is provided by a 96-pin DIN female connector.

The RLC 19 shown in FIG. 6 includes one dual communication port with two inputs (RXE and RXF) and two outputs (TXE and TXF). RLC 19 also includes a plurality of relays, which are represented as switches in FIG. 6, which are operated under control of the corresponding FLC 17. There are two "normal-through" paths, namely, from RXE to TXF and from RXF to TXE. RLC 19 also provides four paths to a monitoring bus. Two of the paths, from a MON_TXE to TXE and from MON_TXF to TXF, are direct paths. The other two paths are from RXE to MON_RXE and from RXF to MON_RXF and can be direct paths or paths through the B or B&T circuits, depending upon the desired test mode.

Each RLC 19 has the capability of providing loopback connections at the communication port, from RXE to TXE and from RXF to TXF. It should be noted that, in a preferred embodiment, two rear line cards 19 (upper and lower) are used in each slot. This arrangement has the advantage that, in the event that a line card needs to be replaced, only one line needs to be placed temporarily out of service. It will be appreciated that a single line card accommodating two duplex communication lines may also be employed.

Figure 7A:
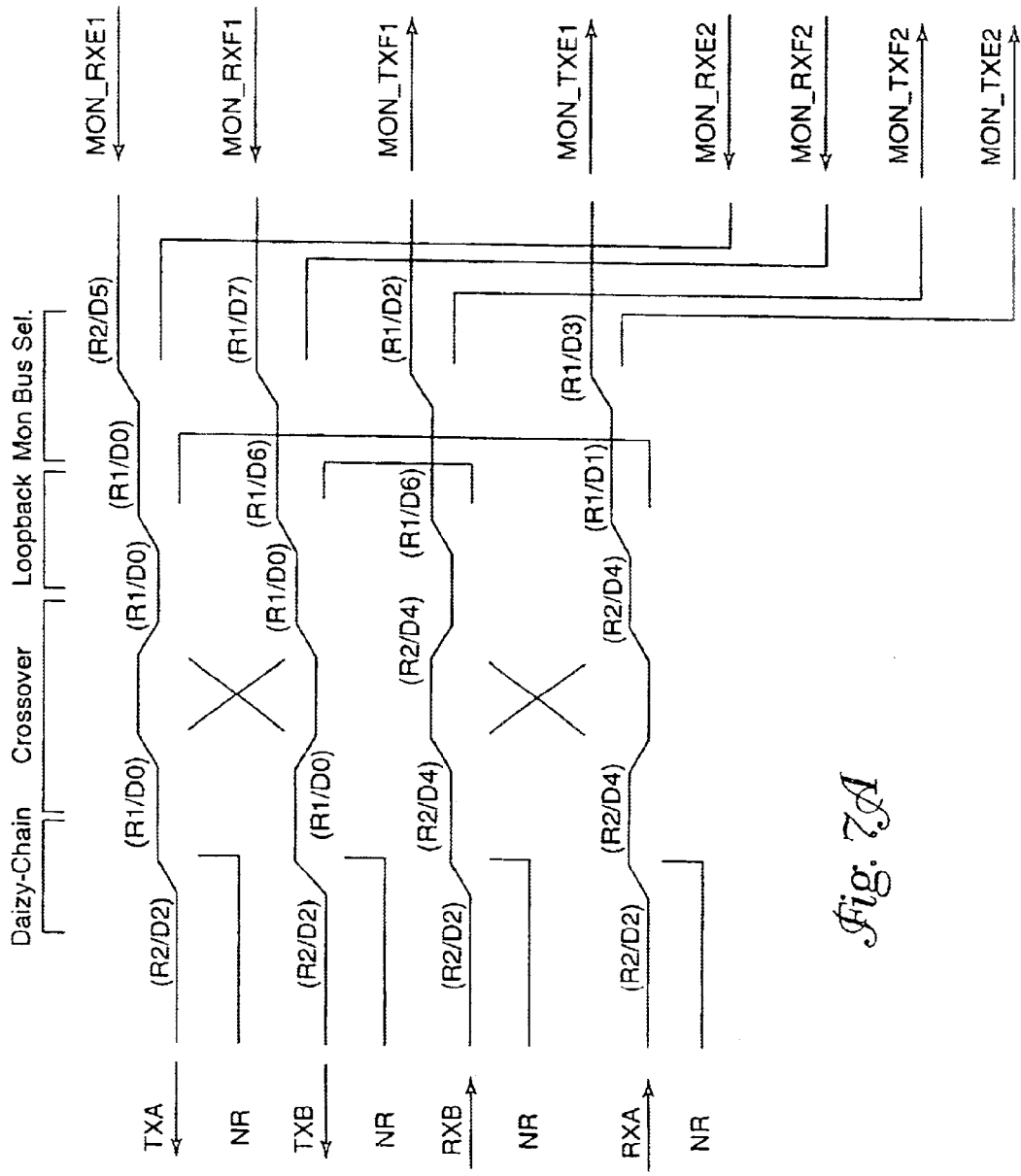
FIG. 7A is a schematic block diagram of a Type-1 rear test card in accordance with an embodiment of the present invention.
Figure 7B:
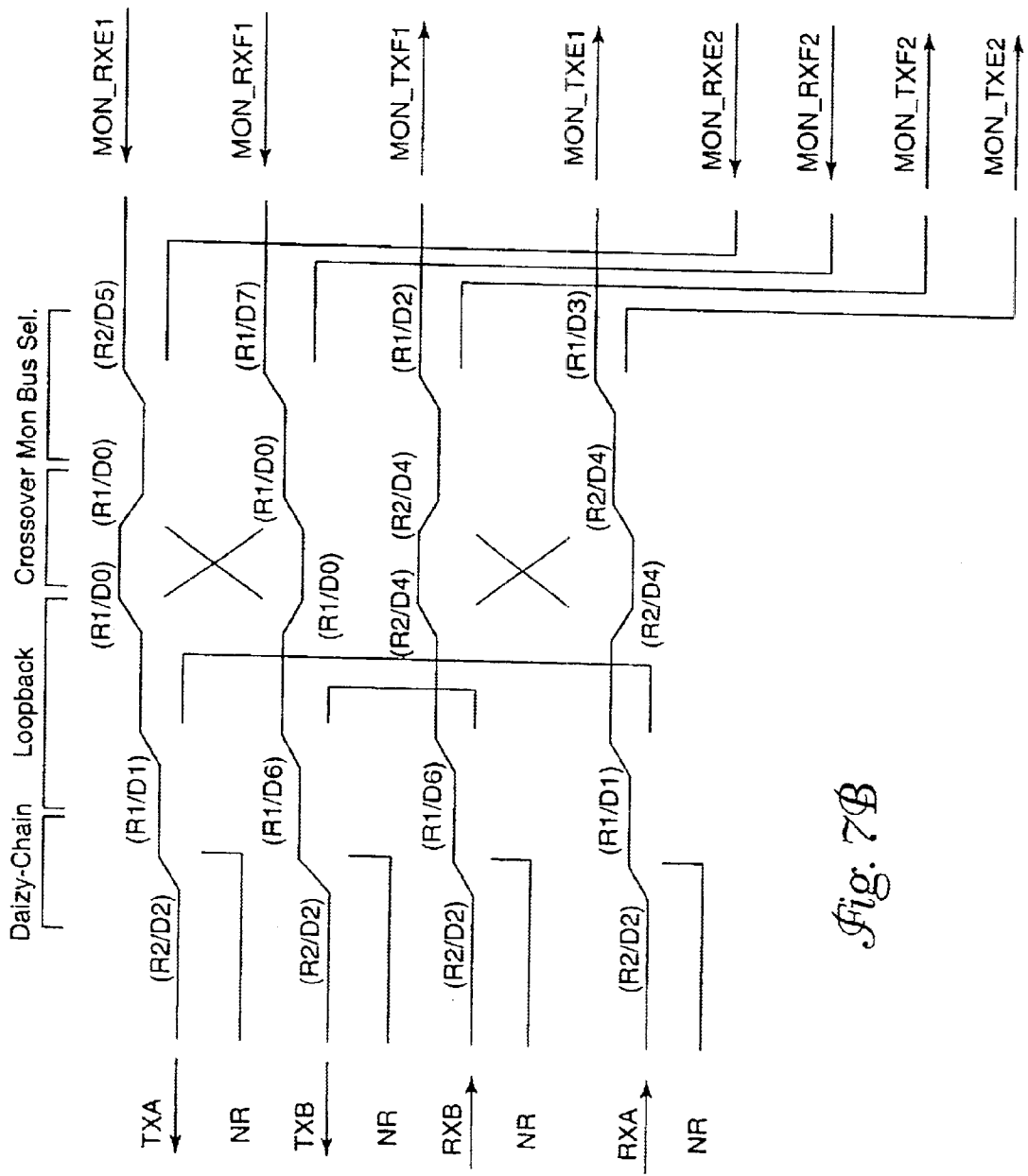
FIG. 7B is a schematic block diagram of a Type 2 rear test card in accordance with an embodiment of the present invention.

The rear test card (RTC) 39 is preferably provided in two types. FIGS. 7A and 7B are schematic block diagrams of a Type 1 RTC and a Type 2 RTC, respectively. Both RTC types includes one dual test port with two inputs (RXA and RXB) and two outputs (TXA and TXB). Each RTC 39 also includes a plurality of relays, depicted as switches, which are operated under control of a front test card (FTC) 37. The Type 1 RTC 39, shown in FIG. 7A, can provide loopback for many of the inputs to any of the outputs. The Type 2 RTC 39, shown in FIG. 7B, can provide loopback from RXA to TXA and from RXB to TXB only. On the other hand, RTC Type 1 cannot provide loopback at the unused port when A Split, AX Split, B Split and BX Split modes are selected.

Four connectors labeled NR in FIGS. 7A and 7B provide connection to the next rack mount in "daisy-chain" configurations. Depending on the position of the "daisy-chain" contacts shown in FIGS. 7A & 7B, the test port can be connected either to one of the monitoring buses of the present rack mount or the next rack mount. The "crossover" contacts provide direct or cross-connections for the inputs (RXA, RXB) and for the outputs (TXA, TXB). The "loopback" contacts provide loopback connections from RXA to TXA and from RXB to TXB. The "MON Bus Select" contacts provide connections to either of the two monitoring buses, MB1, MB2.

RTC 39 includes three interfaces: one to the communication line test equipment; one to the next rack mount; and one to the motherboard 10. The interface to the communication line test equipment is provided by four BNC connectors, such as RXA, TXA, RXB and TXB shown in FIG. 2. The interface to the next rack mount is provided by four BNC connectors labeled "next rack," which is also shown in FIG. 2. The interface to the motherboard 10 is provided by one 96 pin DIN female connector.

Figure 8:
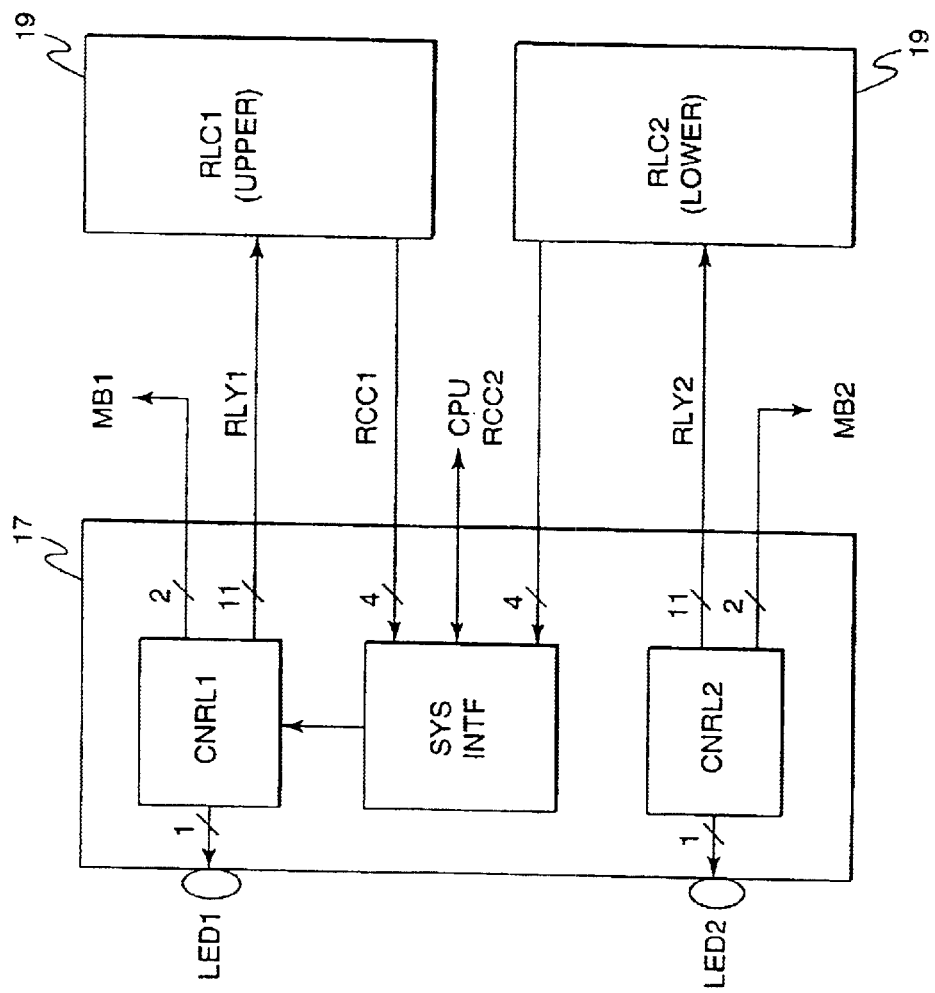
FIG. 8 is a functional block diagram illustrating the operation of a front line card of a line access module in accordance with an embodiment of the present invention.

FIG. 8 is a functional block diagram illustrating the operation of a front line card (FLC) 17 in accordance with an embodiment of the present invention. For purposes of illustration, and not of limitation, an FLC 17 is shown coupled to a pair of rear line cards 19, RLC1 and RLC2, each of which is controlled by FLC 17. FLC 17, in turn, is controlled by a CPU provided in control card 25. FLC 17 includes two control blocks (CTRL1 and CTRL2), each of which provides control to a respective RLC 19 (RLC1 and RCL2, respectively).

FLC 17 further includes a set of relays for defining part of a respective monitoring bus MB1, MB2. Two light emitting diodes (LED1 and LED2) provided on the front of FLC 17 indicate the status of the corresponding RLCs 19. By way of example, when a respective RLC 19 is in a test mode, the corresponding LED is illuminated, whereas when a loopback mode is selected, the corresponding LED blinks. In addition to relay drivers, control blocks CTRL1 and CTRL2 also includes two 8-bit control registers. Registers 1 and 2 are provided in CTRL1 for RCL1, and Registers 3 and 4 are provided in CTRL2 for RLC2.

The bits in the odd register (Register 1 and Register 3) have the following effect on the relays of the corresponding RLC 19 in accordance with an embodiment of the present invention:

D7: when 0, closes "normal through" path from RXE to TXF.
    when 1, connects RXE to monitoring bus.
D6: when 0, closes "normal through" path from RXE to TXF.
    when 1, connects TXF to monitoring bus.
D5: when 0, selects B & T circuit.
    when 1, selects direct connection from RXE to monitoring bus.
D4: when 0, selects split mode.
    when 1, selects monitoring mode.
D3: when 0, closes "normal through" path from RXF to TXE.
    when 1, connects RXF to monitoring bus.
D2: when 0, select B & T circuit.
    when 1, selects direct connection from RXF to monitoring bus.
D1: when 0, selects split mode.
    when 1, selects monitoring mode.
D0: when 0, closes "normal through" path from RXF to TXE.
    when 1, connects TXE to monitoring bus.

Similarly, the even control register (Registers 2 and 4) have eight bits which have the following effect on the relays of the corresponding RLC 19 in accordance with an embodiment of the present invention:

D7: when 0, disconnects MON_RXE and MON_TXF from the RLC.
    when 1, connects MON_RXE and MON_TXF to the RLC.
D6: when 0, disconnects MON_RXF and MON_TXE from the RLC.
    when 1, connects MON_RXF and MON_TXE from the RLC.

-continued

D5: when 0, de-selects loopback from RXE to TXE.
    when 1, selects loopback from RXE to TXE.
D4: when 0, selects loopback from RXF to RXF.
    when 1, de-selects loopback from RXF to TXF.
D3: when 0, disconnects the shield of RXE-TXF switching circuit to the shield of the monitoring bus.
    when 1, connects the shield of RXE-TXF switching circuit to the shield of the monitoring bus.
D2: when 0, disconnects the shield of RXF-TXE switching circuit to the shield of the monitoring bus.
    when 1, connects the shield of RXF-TXE switching circuit to the shield of the monitoring bus.
D1: when 0, disconnects the shield of RXE-TXF switching circuit to the shield of the RXF-TXE switching circuit.
    when 1, connects the shield of RXE-TXF switching circuit to the shield of the RXF-TXE switching circuit.
D0: when 0, turns off the LED for the corresponding RLC.
    when 1, illuminates the LED for the corresponding RLC.

It will be appreciated that the control registers CNRL1 and CNRL2 of RLC 19 allow a large number of different modes of operation by virtue of the different 8 bit words that can be provided in each register. Table 1 provided below exemplifies a number of different modes of operation that may be available for each RLC 19. The described modes correspond to various test modes defined by the Bellcore standards for testing communication equipment.

The bits of control Register 1 of CTRL1 in FTC 37 have the following effect on the relays of RTC 39 in accordance with an embodiment of the present invention:

D7: when 0, selects MON_RXB line from the upper monitoring bus (MB1).
    when 1, selects MON_RXB line from the lower monitoring bus (MB2).
D6: when 0, de-selects loopback between RXB-TXB (if crossover is not active).
    when 1, selects loopback between RXB-TXB (if crossover is not active).
D5: not used.
D4: not used.
D3: when 0, selects MON_TXA line from the upper monitoring bus (MB1).
    when 1, selects MON_TXA line from the lower monitoring bus (MB2).
D2: when 0, selects MON_TXB line from the upper monitoring bus (MB1).
    when 1, selects MON_TXB line from the lower monitoring bus (MB2).
D1: when 0, de-selects loopback between RXA-TXA (if crossover is not active).
    when 1, selects loopback between RXA-TXA (if crossover is not active).
D0: when 0, selects direct connections to TXA and TXB (crossover).
    when 1, selects cross-connections to TXA and TXB (crossover).

TABLE 1

| Mode | Control Registers 1 (3) (R1, R3) | | | | | | | | Control Register 2 (4) (R2, R4) | | | | | | | |
|---|---|---|---|---|---|---|---|---|---|---|---|---|---|---|---|---|
| | D7 | D6 | D5 | D4 | D3 | D2 | D1 | D0 | D7 | D6 | D5 | D4 | D3 | D2 | D1 | D0 |
| E(X) Monitor | x | 0 | 0 | 0 | x | 0 | 0 | 0 | 1 | 0 | 0 | 0 | 1 | 0 | 0 | 1 |
| F(X) Monitor | x | 0 | 0 | 0 | x | 0 | 0 | 0 | 0 | 1 | 0 | 0 | 0 | 1 | 0 | 1 |
| EF(X) Monitor | x | 0 | 0 | 0 | x | 0 | 0 | 0 | 1 | 1 | 0 | 0 | 1 | 1 | 0 | 1 |
| E(X) Split (F Loop) | x | 1 | 0 | 0 (1) | x | 0 | 0 | 1 | 1 | 1 | 0 | 0 (1) | 1 | 1 | 1 | 1 |
| E(X) Split w B & T (F Loop) | x | 1 | 1 | 0 (1) | x | 0 | 0 | 1 | 1 | 1 | 0 | 0 (1) | 1 | 1 | 1 | 1 |
| F(X) Split (E Loop) | x | 0 | 0 | 1 | x | 1 | 0 | 0 (1) | 1 | 1 | 0 (1) | 0 | 1 | 1 | 1 | 1 |
| F(X) Split w B & T (E Loop) | x | 0 | 0 | 1 | x | 1 | 1 | 0 (1) | 1 | 1 | 0 (1) | 0 | 1 | 1 | 1 | 1 |
| EF(X) Split | x | 1 | 0 | 1 | x | 1 | 0 | 1 | 1 | 1 | 0 | 0 | 1 | 1 | 1 | 1 |
| EF(X) Split w B & T | x | 1 | 1 | 1 | x | 1 | 1 | 1 | 1 | 1 | 0 | 0 | 1 | 1 | 1 | 1 |
| A(X) Split | x | 1 | 0 | 1 | x | 0 | 0 | 0 | 1 | 0 | 0 | 0 | 1 | 0 | 0 | 1 |
| A(X) Split w B & T | x | 1 | 1 | 1 | x | 0 | 0 | 0 | 1 | 0 | 0 | 0 | 1 | 0 | 0 | 1 |
| B(X) Split | x | 0 | 0 | 0 | x | 1 | 0 | 1 | 0 | 1 | 0 | 0 | 0 | 1 | 0 | 1 |
| B(X) Split w B & T | x | 0 | 0 | 0 | x | 1 | 1 | 1 | 0 | 1 | 0 | 0 | 0 | 1 | 0 | 1 |
| AB(X) Split | x | 1 | 0 | 1 | x | 1 | 0 | 1 | 1 | 1 | 0 | 0 | 1 | 1 | 1 | 1 |
| AB(X) Split w B & T | x | 1 | 1 | 1 | x | 1 | 1 | 1 | 1 | 1 | 0 | 0 | 1 | 1 | 1 | 1 |
| E Loop | x | 0 | 0 | 0 | x | 0 | 0 | 1 | 0 | 0 | 1 | 0 | 0 | 0 | 1 | BL |
| F Loop | x | 0 | 0 | 1 | x | 0 | 0 | 0 | 0 | 0 | 0 | 1 | 0 | 0 | 1 | BL |
| EF Loop | x | 0 | 0 | 1 | x | 0 | 0 | 1 | 0 | 0 | 1 | 1 | 0 | 0 | 1 | BL |
| DS1 Drop & Insert A* | x | 1 | 1 | 1 | x | 0 | 0 | 0 | 1 | 1 | 0 | 0 | 1 | 1 | 1 | 1 |
| DS1 Drop & Insert B* | x | 0 | 0 | 0 | x | 1 | 1 | 1 | 1 | 1 | 0 | 0 | 1 | 1 | 1 | 1 |

Figure 9:
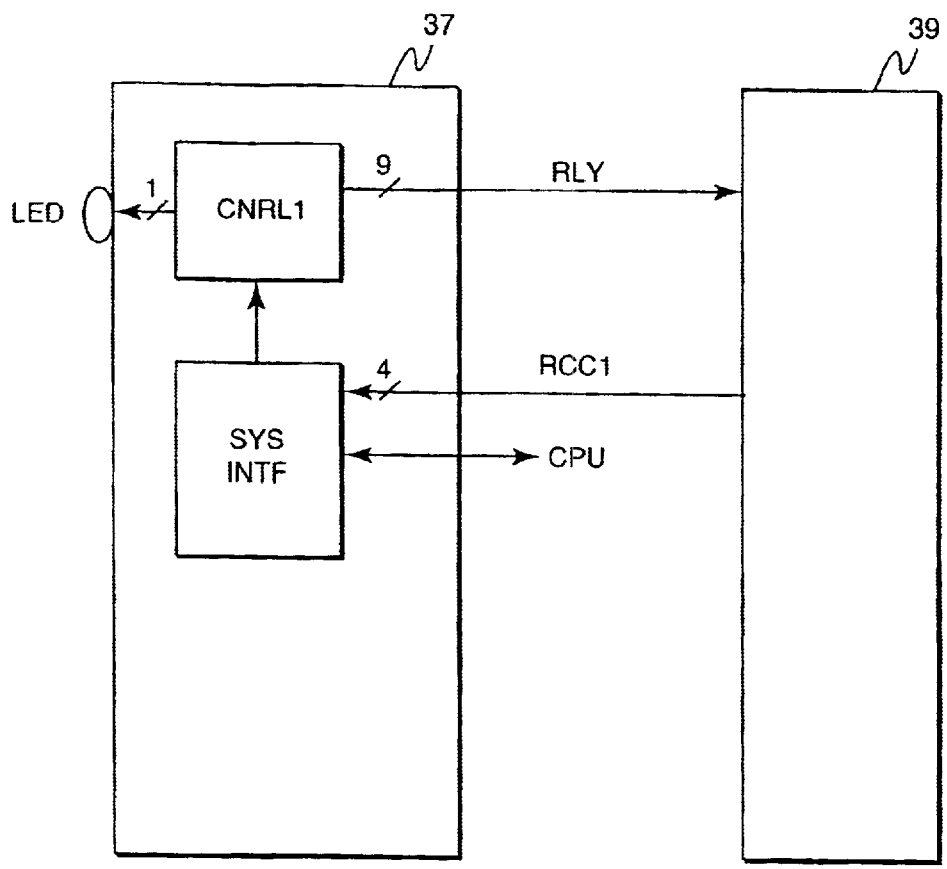
FIG. 9 is a schematic block diagram illustrating the operation of a front test card of a test card module in accordance with an embodiment of the present invention.

FIG. 9 is a schematic block diagram illustrating the operation of a front test card (FTC) 37 in accordance with an embodiment of the present invention. FTC 37 controls the relays in the rear test card (RTC) 39 and is itself controlled by the CPU provided in the control card 25. FTC 37 includes a single control block (CTRL1) which provides control to the RTC 39. One light emitting diode (LED) on the front of FTC 37 indicates the status of the RTC 39. When RTC 39 is in a test mode, the LED is illuminated, whereas when RTC 39 is in a loopback mode, the LED blinks. FTC 37 contains relay drivers for RTC 39 and two 8-bit control registers.

The bits of control Register 2 of CNRL1 in FTC 37 have the following effect on the relays of the RTC 39 in accordance with an embodiment of the present invention:

D7: not used.
D6: not used.
D5: when 0. selects MON_RXA line from the upper monitoring bus (MB1).
    when 1, selects MON_RXA line from the lower monitoring bus (MB2).

-continued

D4: when 0, selects direct connections to RXA and RXB (crossover).
    when 1, selects cross-connections to RXA and RXB (crossover).
D3: not used.
D2: when 0, selects local Rack.
    when 1, selects Next Rack.
D1: not used.
D0: when 0, turns off the test LED.
    when 1, illuminates the test LED.

It will therefore be appreciated that the different combinations of bits available in the two control Registers of CNRL1 in FTC 37 will produce a large number of operating modes in RTC 39. Table 2 provided below exemplifies various operating modes available for RTC 39 in accordance with an embodiment of the present invention.

this embodiment, also accommodates a number of switching jacks, typically coaxial jacks, whereby patch cords may be employed to temporarily redirect connections. The signal pathways of the patching circuitry, including those established through switching jacks and patch cords/plugs, are preferably implemented to have a characteristic impedance, such as a 75 ohm characteristic impedance, and excellent frequency characteristics.

By having equipment and facilities terminate on a test access system employing a cross-connect capability, a service provider is able to manually patch around trouble spots, or rearrange equipment and facilities without service interruption. A service provider may also test selected communication lines established through either hardwired connections or temporary patch connections.

Figure 12B:
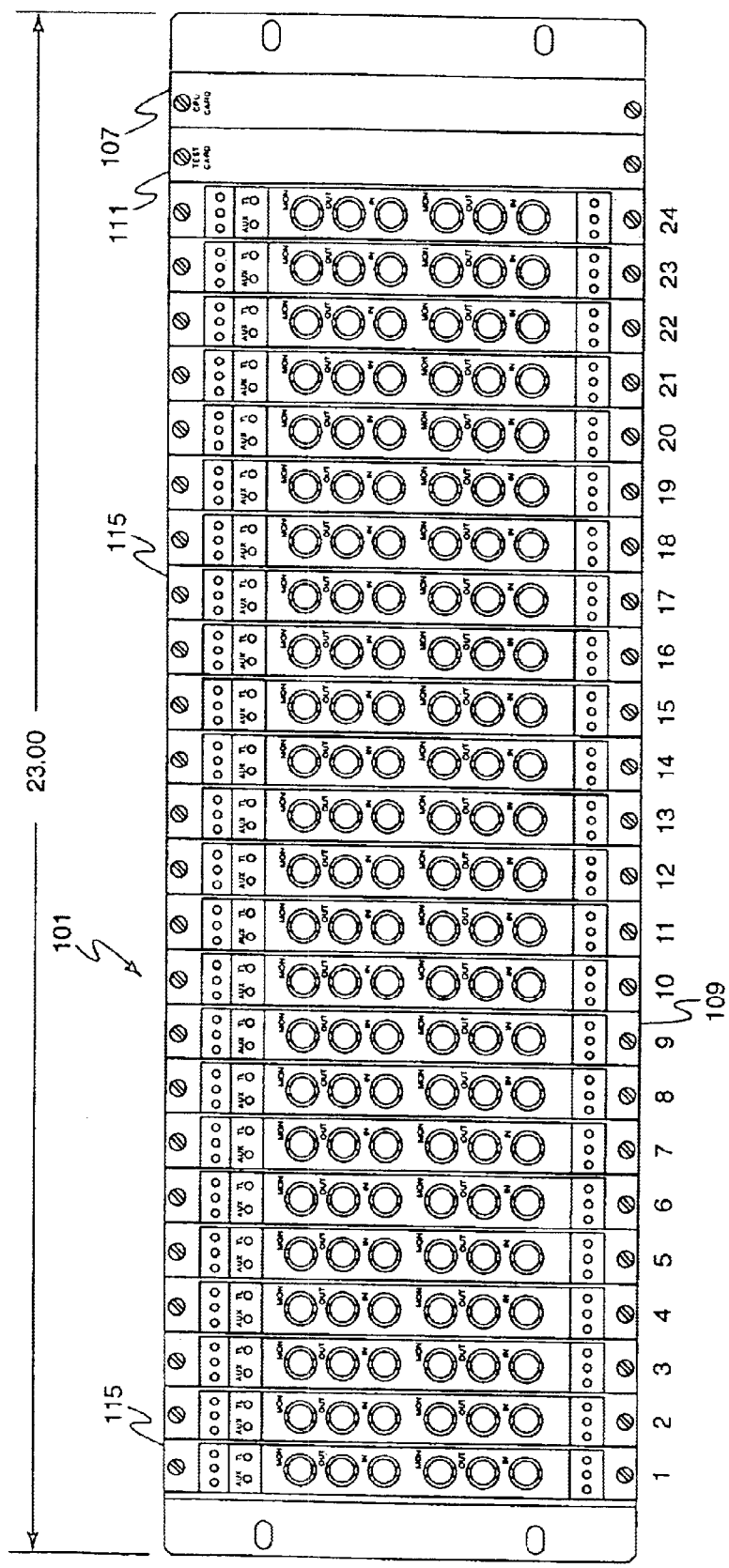

As is shown in FIGS. 12A and 12B, test access system 101 includes a chassis 109 which defines the physical space

TABLE 2

| | Control Registers 1 (R1) | | | | | | | | Control Register 2 (R2) | | | | | | | |
|---|---|---|---|---|---|---|---|---|---|---|---|---|---|---|---|---|
| Mode | D7 | D6 | D5 | D4 | D3 | D2 | D1 | D0 | D7 | D6 | D5 | D4 | D3 | D2 | D1 | D0 |
| E Monitor (B Loop) | A | 0 (1) | X | X | A | A | 0 | 0 | X | X | A | 0 | X | 0 | X | 1 |
| EX Monitor (A Loop) | A | 0 (1) | X | X | A | A | 0 | 1 | X | X | A | 0 | X | 0 | X | 1 |
| F Monitor (A Loop) | A | 0 | X | X | A | A | 0 (1) | 0 | X | X | A | 0 | X | 0 | X | 1 |
| FX Monitor (B Loop) | A | 0 | X | X | A | A | 0 (1) | 1 | X | X | A | 0 (1) | X | 0 | X | 1 |
| EF Monitor | A | 0 | X | X | A | A | 0 | 0 | X | X | A | 0 | X | 0 | X | 1 |
| EFX Monitor | A | 0 | X | X | A | A | 0 | 1 | X | X | A | 0 | X | 0 | X | 1 |
| E Split (B Loop) | A | 0 (1) | X | X | A | A | 0 | 0 | X | X | A | 0 | X | 0 | X | 1 |
| EX Spliy (A Loop) | A | 0 (1) | X | X | A | A | 0 | 1 | X | X | A | 1 | X | 0 | X | 1 |
| F Split (Loop) | A | 0 | X | X | A | A | 0 (1) | 0 | X | X | A | 0 | X | 0 | X | 1 |
| FX Split (B Loop) | A | 0 | X | X | A | A | 0 (1) | 1 | X | X | A | 1 | X | 0 | X | 1 |
| EF Split | A | 0 | X | X | A | A | 0 | 0 | X | X | A | 0 | X | 0 | X | 1 |
| EFX Split | A | 0 | X | X | A | A | 0 | 1 | X | X | A | 1 | X | 0 | X | 1 |
| A Split | A | 0 | X | X | A | A | 0 | 0 | X | X | A | 1 | X | 0 | X | 1 |
| AX Split | A | 0 | X | X | A | A | 0 | 1 | X | X | A | 0 | X | 0 | X | 1 |
| B Split | A | 0 | X | X | A | A | 0 | 0 | X | X | A | 1 | X | 0 | X | 1 |
| BX Split | A | 0 | X | X | A | A | 0 | 1 | X | X | A | 0 | X | 0 | X | 1 |
| AB Split | A | 0 | X | X | A | A | 0 | 0 | X | X | A | 1 | X | 0 | X | 1 |
| ABX Split | A | 0 | X | X | A | A | 0 | 1 | X | X | A | 0 | X | 0 | X | 1 |
| A Loop | X | 0 | X | X | X | X | 1 | 0 | X | X | X | 0 | X | 0 | X | BL |
| B Loop | X | 1 | X | X | X | X | 0 | 0 | X | X | X | 0 | X | 0 | X | BL |
| AB Loop | X | 1 | X | X | X | X | 1 | 0 | X | X | X | 0 | X | 0 | X | BL |
| Primary Loop* | X | 0 | X | X | X | X | 1 | 0 | X | X | X | 0 | X | 0 | X | BL |
| Secondary Loop* | X | 1 | X | X | X | X | 0 | 0 | X | X | X | 1 | X | 0 | X | BL |
| DS1 Drop & Insert A* | A | 0 | X | X | A | A | 0 | 1 | X | X | A | 1 | X | 0 | X | 1 |
| DS1 Drop & Insert B* | A | 0 | X | X | A | A | 0 | 0 | X | X | A | 0 | X | 0 | X | 1 |
| Next Rack | X | X | X | X | X | X | X | X | X | X | X | X | 1 | X | 1 |

In accordance with another embodiment, and with reference to FIGS. 12A and 12B, a test access system 101 in accordance with the principles of the present invention provides a manual patching capability through employment of line access cards 115 which include single or multiple patch circuitry. A test access system 101 according to this embodiment of the present invention combines the features and advantages of the automatic remote controlled test access capabilities described hereinabove with the convenience and flexibility of manually establishing desired or needed cross-connections.

A test access system employing a cross-connect capability provides a termination point for permanently connected equipment, and, through use of patch circuitry according to needed to house the various cards of the system 101. Chassis 109 includes an control bus 113 which provides for the communication of control and information signals between each of the line access cards 115 and other cards and busses of the test access system 101. Power distribution to all of the cards of system 101 is also provided by chassis 109. Chassis 109 further provides physical connections to all control connections of system 101. Central processing unit (CPU) 107 coordinates the various control functions with respect to the cards of test access system 101. CPU 107 also controls the various communications tasks with respect to the management software and other linked test access systems 101.

Each of the line access cards 115, according to this embodiment of the present invention, provides jack interface access to one or more corresponding communication lines, such as DS-3 transmission lines. A line access card 115 employing a jack interface access capability also provides for the establishment of cross-connections via dedicated busses. Line access cards 115 further provide for test access to high speed communication lines via a test bus 116 (e.g., network of relays), and access to one or more test busses for accessing one or more testing devices. A test card 111 provides an interface between line access cards 115, selected communications lines to be tested, and external or built-in test equipment. A power supply 105 provides the required power for the test access system 101.

Figure 13:
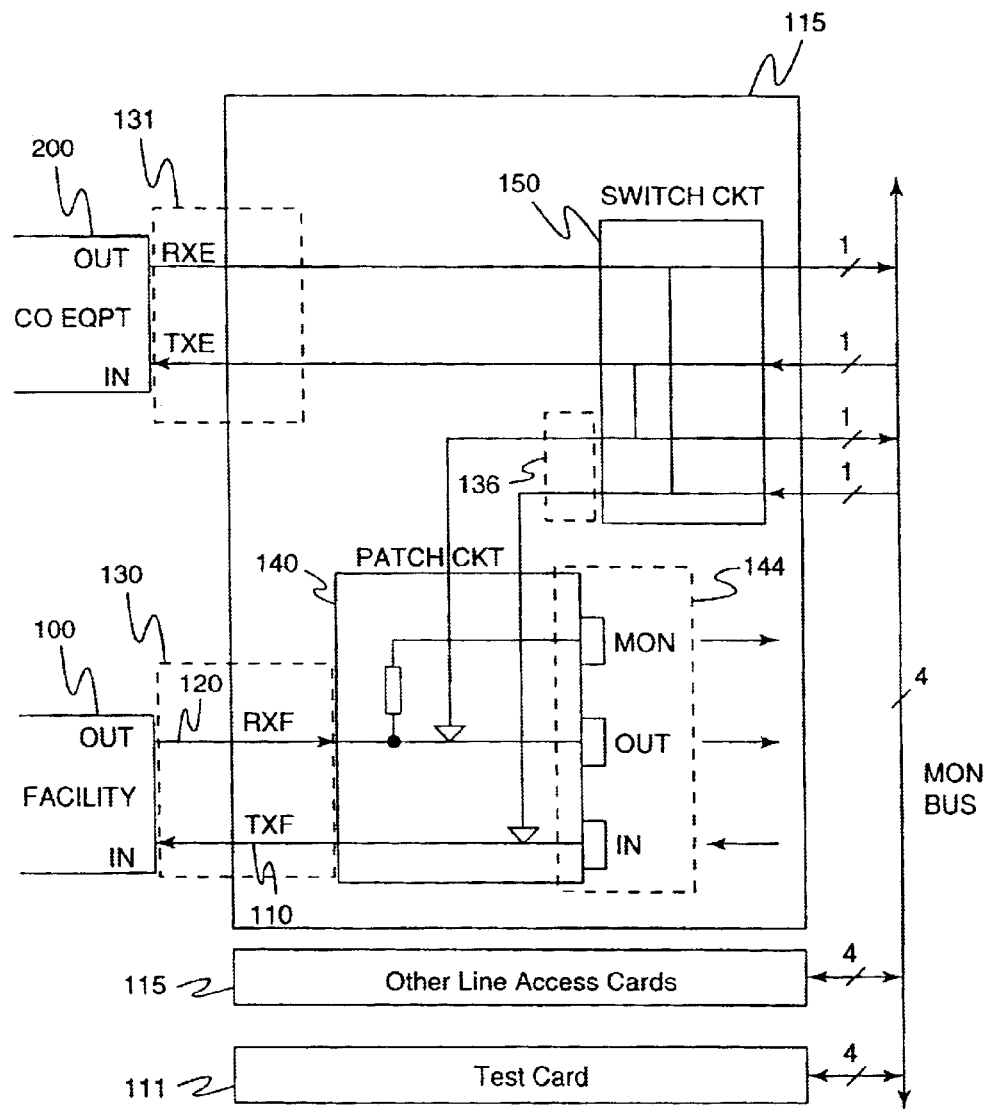
FIGS. 13–15 show a block diagram, front view, and terminal layout, respectively, of a communication line access card incorporating a single cross-connect patch in accordance with an embodiment of the present invention.
Figure 14:
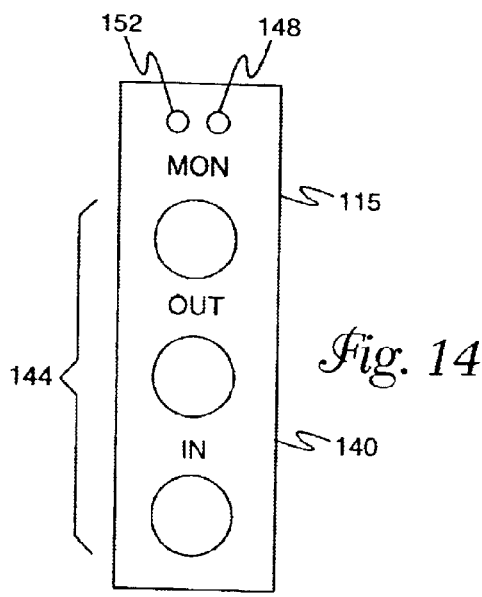

An embodiment of a line access card 115 having a patch access capability is shown in FIG. 13. Line access card 115, in accordance with this embodiment, provides for cross-connections, switching, testing, and monitoring, including establishing permanent and temporary connections and terminations, respectively, to occur at a facility side 100 of a telecommunications network via transmit and receive lines, TXF 110 and RXF 120, respectively. FIG. 14 provides a front view of line access card 115 embodied in a module designed for "plug and play" operation when installed in a test access system. For example, modular line access card 115 shown in FIGS. 13 and 14 may be slid into an available slot of chassis 109 shown in FIGS. 12A and 12B. When properly installed, signal and power connectors respectively provided on chassis 109 and line access card 115 matingly engage, without need of manual intervention, to establish required signal and power connections therebetween.

The embodiment of line access card 115 shown in FIGS. 13 and 14 incorporates a single patching capability. As can be seen in FIGS. 13 and 14, line access card 115 includes jacks 144 to provide a user with manual and direct access to two communication lines or channels routed through line access card 115. Each of the facility jacks 144, which are shown vertically aligned as MON (monitor), OUT (output) and IN (input), respectively, correspond to a particular one of the two communication lines (channels).

As is further illustrated in FIGS. 13 and 14, line access card 115, which incorporates a single patch circuit 140, is designed to operate within a test access system by providing a patch connection 140 which permits direct access to the facility side 100 of the communication line circuit. The patch circuit 140 includes three interfaces, namely, facility interface 130, switching circuit interface 136, and jack interface 144. The facility interface 130 is connected to equipment of the facility side 100 (RXF, TXF) of the network. The switching circuit interface 136 is internally connected to the switching circuit 150 of the line access card 115. The jack interface 144 includes three jack connectors located on the front of the line access card 115 labeled IN, OUT, and MON, respectively.

The IN jack provides access to the equipment to which the IN jack is terminated, and can be used to access or transmit signals into the equipment input. The OUT jack is used to monitor the output signals from the equipment to which the OUT jack is terminated. The MON jack serves a similar function as the OUT jack by monitoring communication signals, but without breaking the communication line circuit. In this manner, the MON jack allows for in-service bridging of a digital line without interfering with line operation. In a preferred embodiment, the OUT jack observes the output signals from equipment to which it is terminated by insertion of a patch cord into the OUT jack circuit.

As is also illustrated in FIG. 14, line access card 115, which includes a single patch circuit 140, further includes two LED's 148, 152 located on the front panel of line access card 115. The first LED is a bicolor LED 148 which represents a "TEST/ALM" LED. LED 148 corresponds to a line access port. In a "test" mode, the TEST/ALM LED 148 illuminates a particular color (e.g., green) to indicate whether a certain communication line port is being tested or not. In "alarm" mode, the TEST/ALM LED 148 illuminates a second color (e.g., amber) to indicate an alarm condition on a certain communication line port.

The second LED is a red LED 152 which represents a "TRACER" LED. The TRACER LED 152 is used for identification of the cross-connections between different communication line circuits. The TRACER LED 152 illuminates when a patch cord is inserted into its corresponding MON jack or when activated by a corresponding switch, such as a toggle or plunger switch; the other communication line circuit that cross-connects with the initial circuit also illuminates its corresponding tracer LED 152. This is accomplished by connecting the tracer pins on the rear of the test access unit with the tracer pins of other test access units via wire wrap or Telco pin connectors.

Figure 17:
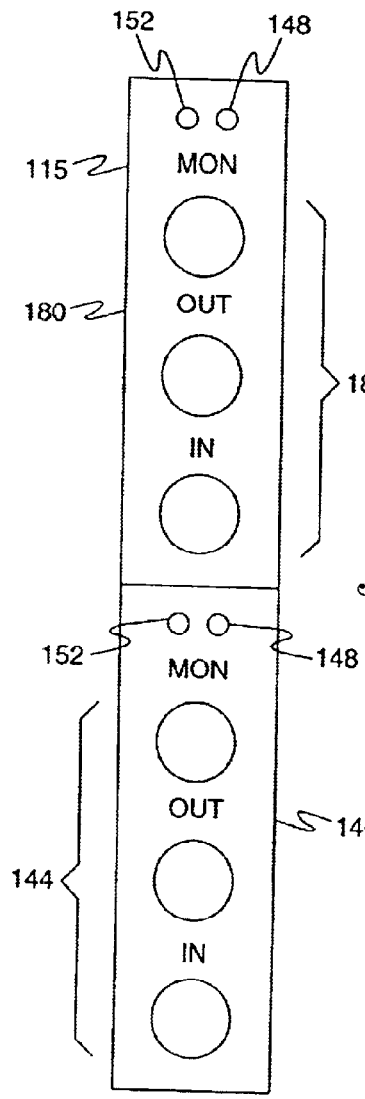
FIGS. 16 and 17 show a block diagram and front view, respectively, of a communication line access card incorporating dual cross-connect patch panels according to another embodiment of the present invention.
Figure 15:
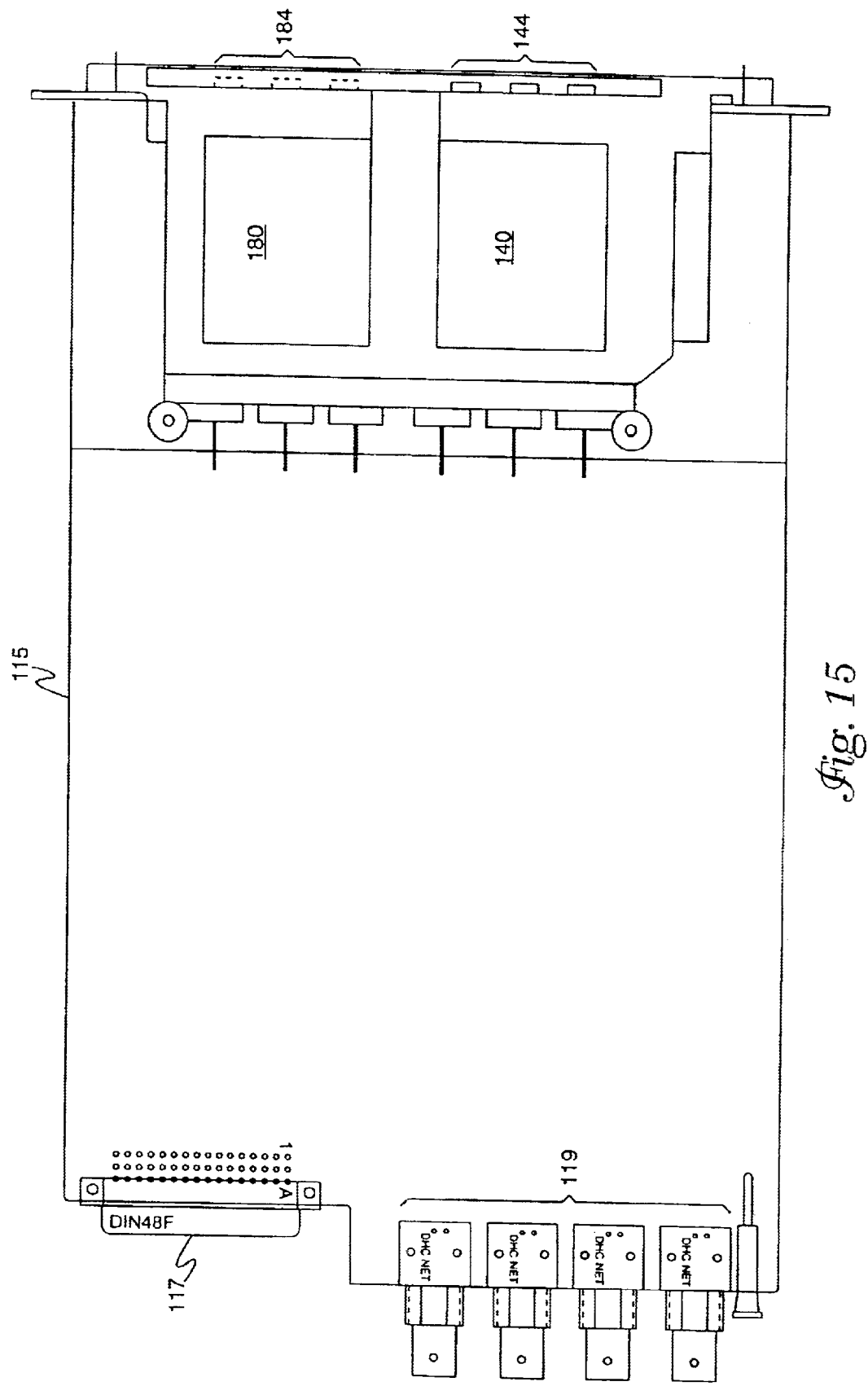
Figure 16:
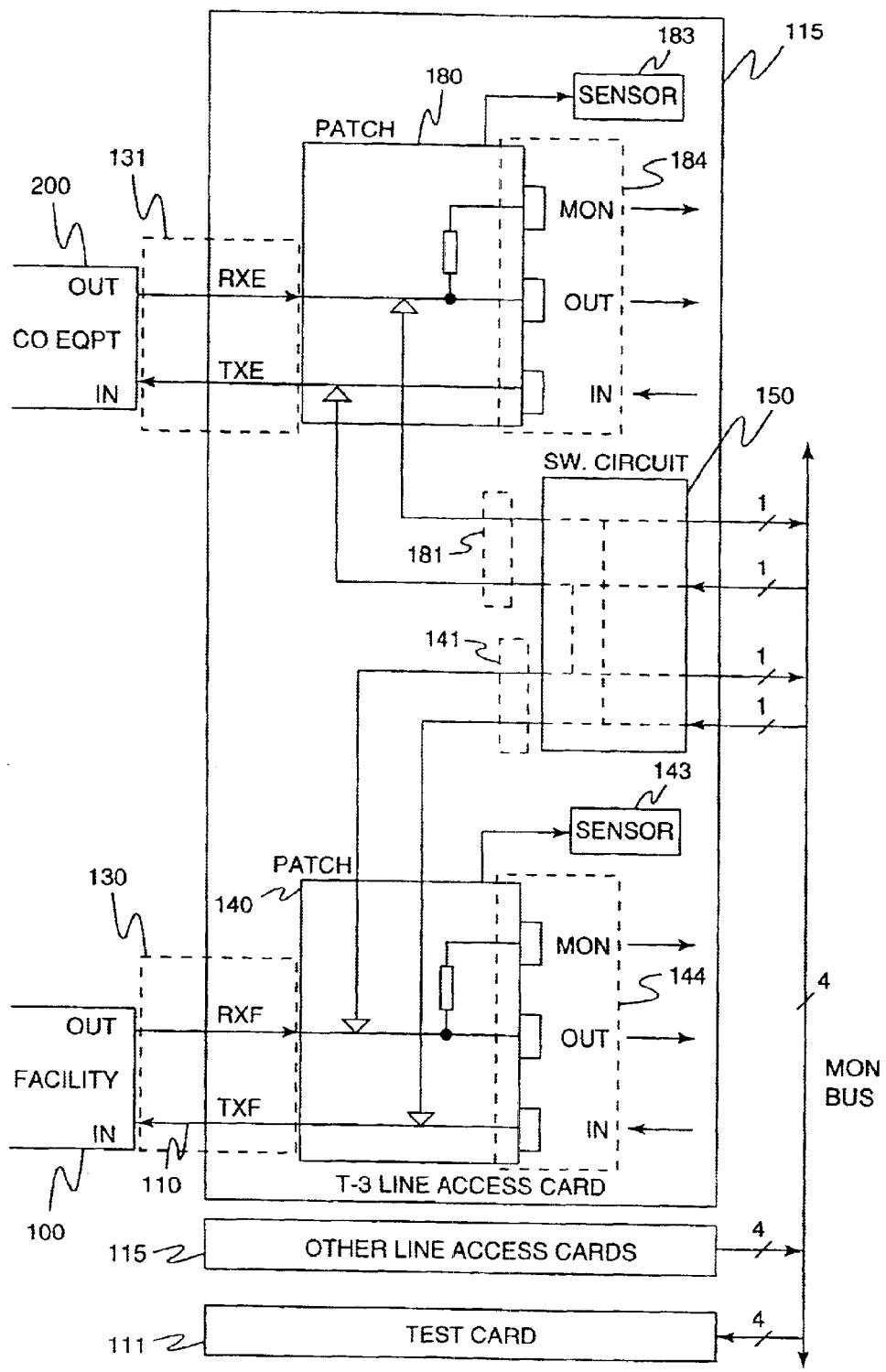

In an alternative embodiment, as is shown in FIGS. 15-17, a line access card 115 may incorporate a dual patch capability by employment of a patch circuit 140 associated with the facility side 100 of a telecommunications network and, in addition, a patch connection 180 connected to equipment side 200 of the network. In accordance with this embodiment, line access card 115 incorporates dual patch circuits 140 and 180 to facilitate line testing at a remote location (i.e., customer premises of the communication lines incoming from an equipment location). The group of line access cards 115 shown in FIG. 12B, for example, depict line access cards incorporating a dual patch capability.

As previously stated, each patch circuit 140, 180 includes an equipment interface 130, 131, a switching circuit interface 141, 181, and a jack interface 144, 184, respectively. The equipment interface 130, 131 of each patch circuit 140, 180 is connected to the facility side 100 or equipment side 200 of a communication line circuit. The switching circuit interface 141, 181 of each patch circuit 140, 180 is internally connected to the switching circuit 150 of the line access card 115. The jack interface 144, 184 of each patch circuit 140, 180 includes three jack connectors located on the front of the line access card 115.

The three jack connectors are labeled IN, OUT, and MON, respectively, and are associated with either the equipment or facility sides 200, 100. Each IN jack provides access to the equipment to which it is terminated, and can be used to transmit signals into the equipment (or facility) input. The OUT jack is used to monitor the output signals from the equipment to which it is terminated. The MON jack, as previously mentioned, provides for in-service bridging of a digital line without interfering with its operation.

Temporary connections may be made using patch cords between jack circuits, thereby permitting restoration of failed services or providing temporary connections for cut-overs. The normal function of a patch cord when used within a cross-connect system environment is to temporarily re-direct a circuit connection to a termination point different from that established by the circuit's hardwired connection. For example, when a plug of a patch cord is inserted into either the OUT jack or IN jack of a line access card 115, the circuit connection to the hardwired connection is broken, such that a new conductivity path is established over the patch cord. The patch plug connected at the opposing end of the patch cord may then be inserted into an appropriate OUT or IN jack of another line access card provided in the same or different chassis to establish a new and generally temporary cross-connection through the patch cord.

It is understood in the industry that TRACE wire or lamp wire is used in a cross-connect system to connect the TRACE LED's of each of the cross-connected circuits for purposes of manually tracing a connection. In accordance with a further embodiment of the present invention, TRACE wire and patch cord connections may be utilized to effectively form scanning busses over which scanning signals may be transmitted in accordance with a unique scanning methodology. This unconventional use of TRACE wire and patch cord connections within a test access/cross-connect system environment, in combination with an unique scanning protocol, provides for the continuous and near real-time acquisition of connection status information which may be maintained and updated in a centralized cross-connect database.

It is readily appreciated by those skilled in the art that maintaining accurate connection records for hundreds of thousands of connections has proven to be impractical, if not impossible, using conventional manual tracing approaches. A cross-connect monitoring system according to this embodiment of the present invention provides for accurate and continuous electronic monitoring and updating of connection records for any number of connections. Details for implementing this embodiment of an intelligent digital test access/cross-connect system that electronically and automatically identifies and monitors all connections established through the line access cards of the system on a continuous basis may be found in co-owned U.S. Ser. No. 08/972,159, filed Nov. 17, 1997 and entitled "System and Method for Electronically Identifying Connections of a Cross-Connect System," which is hereby incorporated herein by reference in its entirety.

FIG. 15 shows a layout of a line access card 115 provided with a dual patch circuit capability. Line access card 115 shown in FIG. 15 includes a number of interfaces in accordance with an embodiment of the present invention. A 48-finger DIN connector 117 provides an interface to the control bus 113 and test/monitor bus 116 shown in FIG. 12A. This interface 117 includes data bus, control signals, and power supply lines. Interface 119 includes four communication line port connections, which in this embodiment constitute four BNC connectors. Two patch circuits 140, 180 and corresponding patch connector sets 144, 184 provide manual access to the facility and equipment sides 100, 200 of the communication line circuits.

With further reference to FIGS. 16 and 17, a line access card provided with a dual patching capability includes two groups of LED's 148, 152 located on the front panel of the line access card 115. The first group consists of bicolor LED's 148 labeled "TEST/ALM". Each of the LED's 148 corresponds to a line access port. In a "test" mode, the TEST/ALM LED's 148 illuminate a particular color (e.g., green) to indicate whether a certain communication line port is being tested or not. In an "alarm" mode, the TEST/ALM LED's 148 illuminate a second color (e.g., amber) to indicate an alarm condition on a certain communication line port.

The second group consists of two red LED's 152 labeled "TRACER," and used for identification of cross-connections established between different communication line circuits. The TRACER LED's 152 illuminate when a patch cord is inserted the corresponding MON jack or when activated by a corresponding switch, such as a toggle or plunger switch;

all other communication line circuits that cross-connect with the initial communication line circuit also illuminate their corresponding TRACER LED's. This is accomplished by connecting the tracer pins on the rear of a test access unit with the tracer pins of other test access units via wire wrap or Telco pin connectors.

Figure 18:
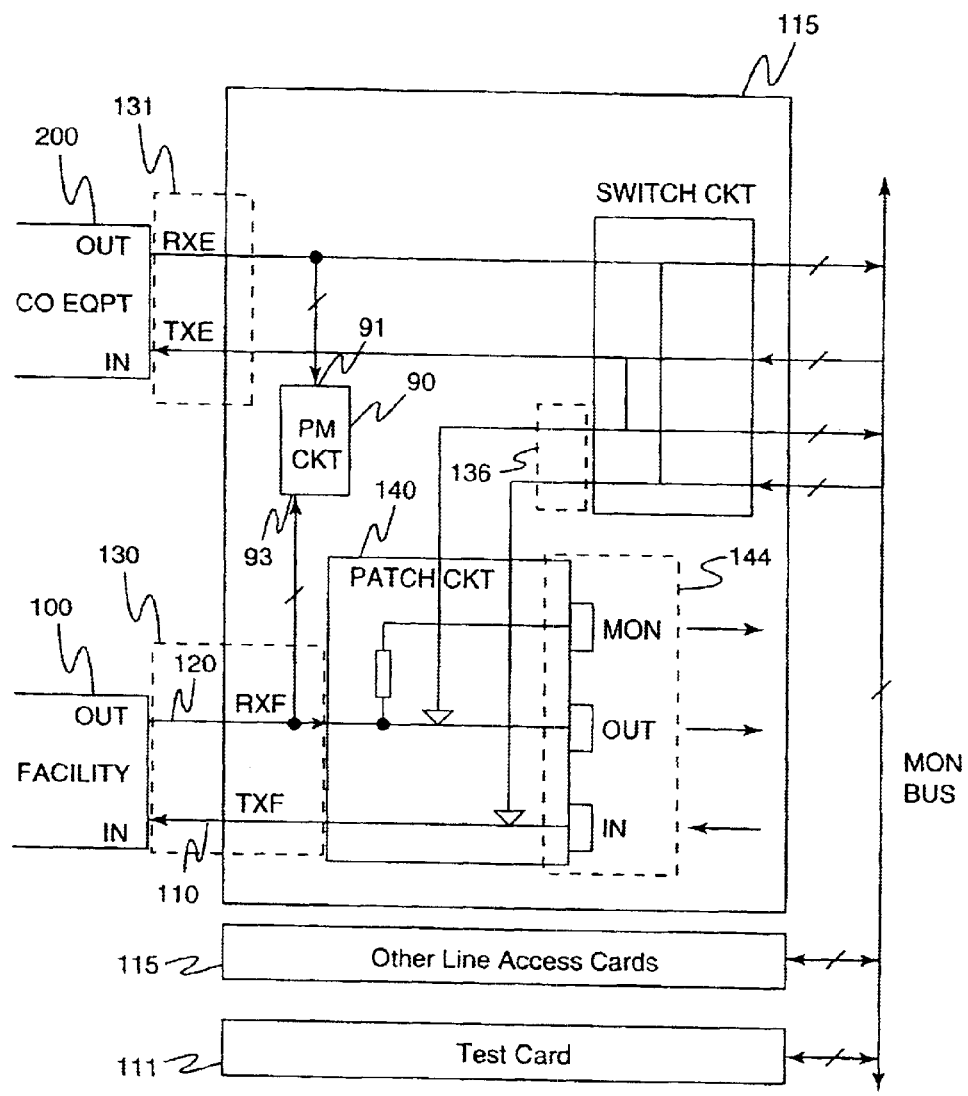
FIG. 18 is a schematic representation of a communication line access card incorporating a performance monitoring capability and single cross-connect patching capability in accordance with an embodiment of the present invention.
Figure 19:
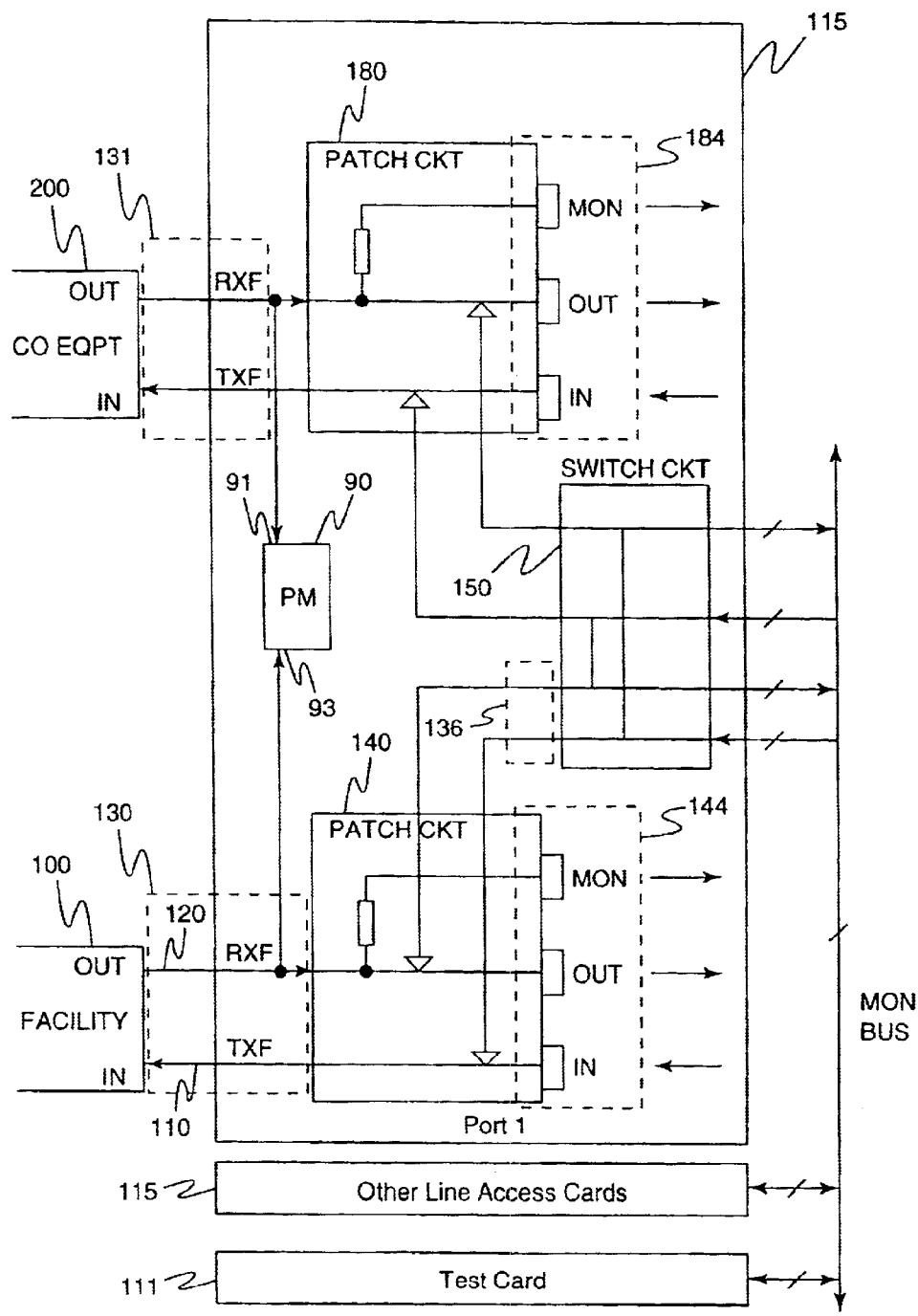
FIG. 19 is a schematic representation of a communication line access card incorporating a performance monitoring capability and dual cross-connect patching capability in accordance with an embodiment of the present invention.

In addition to a line access card 115 of the present invention including either single or dual patch connection capabilities, a line access card 115 may also include a performance monitoring feature 90, as is shown in FIGS. 18 and 19, which is capable of monitoring communication line circuits for variety of line anomalies and error information. Referring now to FIGS. 18 and 19, each line access card 115 is equipped with a monitoring function for collecting line failures from both the facility and equipment sides 100, 200 of a number of different communication lines. The monitoring function in accordance with this embodiment of the present invention may be implement in a test access system employing no patch, single patch, and dual patch circuitry.

Preferably, a performance monitoring function circuit 90 incorporated in a line access card 115 of the present invention represents a high impedance device, such that information signals passing through the line access card 115 are not degraded. This feature is important to allow nonintrusive monitoring of the communication line. In one embodiment, line information is constantly collected and stored in 15 minutes registers, 1 hour registers, and one day registers. Performance monitoring occurs on each of the line access ports 91, 93 simultaneously; that is, no multiplexing occurs in the preferred embodiment, which allows the performance monitor feature to accept simultaneous real time data from each of the associated lines (e.g., RXE, RXF). The information is stored in the registers and can be retrieved at any time by the management system 12.

Once an alarm condition is detected, the CPU immediately sends an alarm condition signal to the management system, which, upon reception, presents it to the user. Each alarm event is presented to the management software via the CPU with a time of day and date stamp. Register information may be collected from the CPU at any time. If SNMP management software with paging capability is used, the management software can page the user for each alarm occurrence. A remote management system well suited for use in a test access system environment of the present invention is disclosed in co-owned U.S. Ser. No. 09/219, 810, filed Dec. 23, 1998 and entitled "Test Access and Performance Monitoring System and Method for Cross-Connect Communication Networks," which is hereby incorporated herein by reference in its entirety.

Performance parameters supported by the performance monitoring and alarm functions of a test access system of the present invention include near-end line performance parameters, and near-end path performance parameters and alarms. Performance monitoring and alarm features are intended to monitor and detect both line and path anomalies and defects. Line anomalies include a bipolar violation (BPV), which occurs as a non-zero pulse of the same polarity of the previous pulse, and excessive zeros (EXZ), which includes any zero string length greater than 7 contiguous zeroes (B8ZS), as well as any zero string length greater than 15 contiguous zeroes (AMI).

Path anomalies include CRC-6 errors and frame bit errors (FE). CRC-6 errors are detected when a received CRC-6 code does not match the CRC-6 code calculated from the received data. Frame bit errors are bit errors occurring in the received frame bit pattern. Line defects include loss of signal (LOS), while path defects comprise out-of-frame (OOF), severely errored frame (SEF), and alarm indication signals (AIS). Severely errored frames include the occurrence of two or more frame bit errors within a window. An AIS event indicates the occurrence of an unframed signal having a "one's density" of at least 99.9% present for at least three seconds. This is indicative of an upstream transmission interruption.

For near-end line failures, an LOS occurs when the LOS defect persists for 2.5 seconds, ±0.5 second. Near-end path failures include and AIS and LOS, while far-end path failures include a remote alarm indication (RAI), which indicates a signal transmitted in the outgoing direction when equipment determines that it has lost the incoming signal. Other indicators include the near-end path failure count (count of near-end path failures) and far-end path failure count. Near-end line performance parameters include code violation-line (CV-L), errored second line (ES-L), and severely errored second-line (SES-1). Near-end path performance parameters include code violation-path (CV-P), errored second path (ES-P), severely errored second-path (SES-P), SEF/AIS second path (SAS-P), and unavailable second path (UAS-P). Alarms supported include red alarm, blue alarm, yellow alarm, corresponding to loss of signal (LOS), alarm indication signal (AIS) and remote alarm indication (RAI), respectively.

Figure 20:
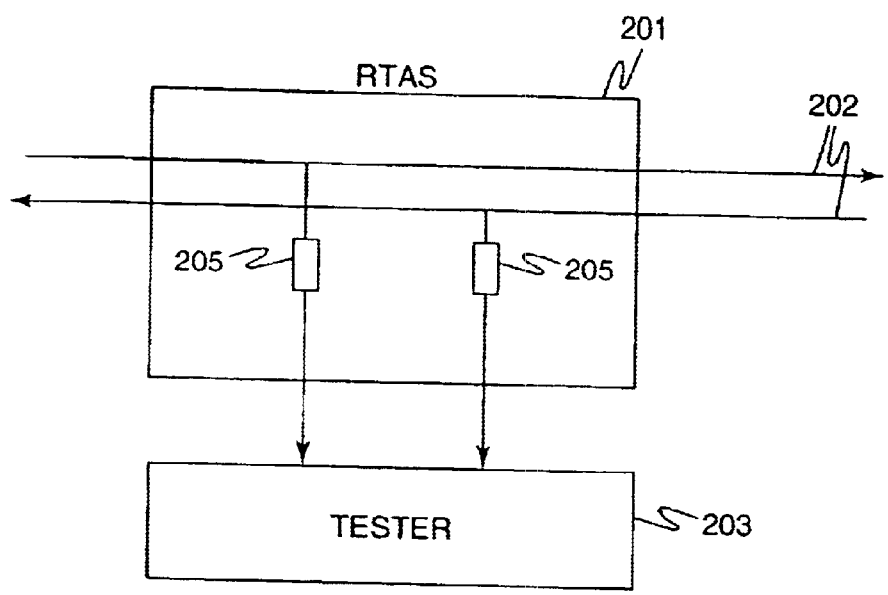
FIGS. 20–22 illustrate in block diagram form three different testing configurations for establishing connectivity between selected communication lines passing through a remote test access system of the present invention and one or more remote testing device.
Figure 21:
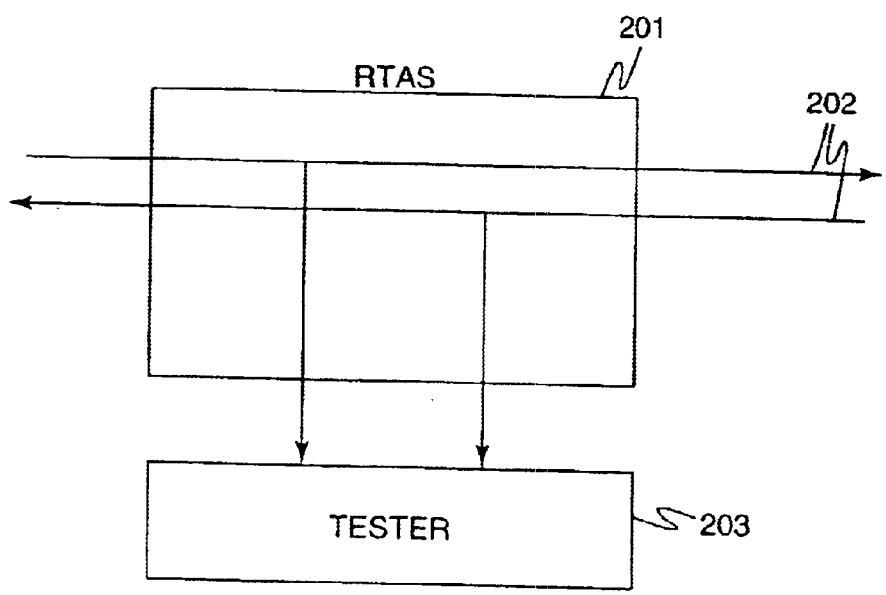
Figure 22:
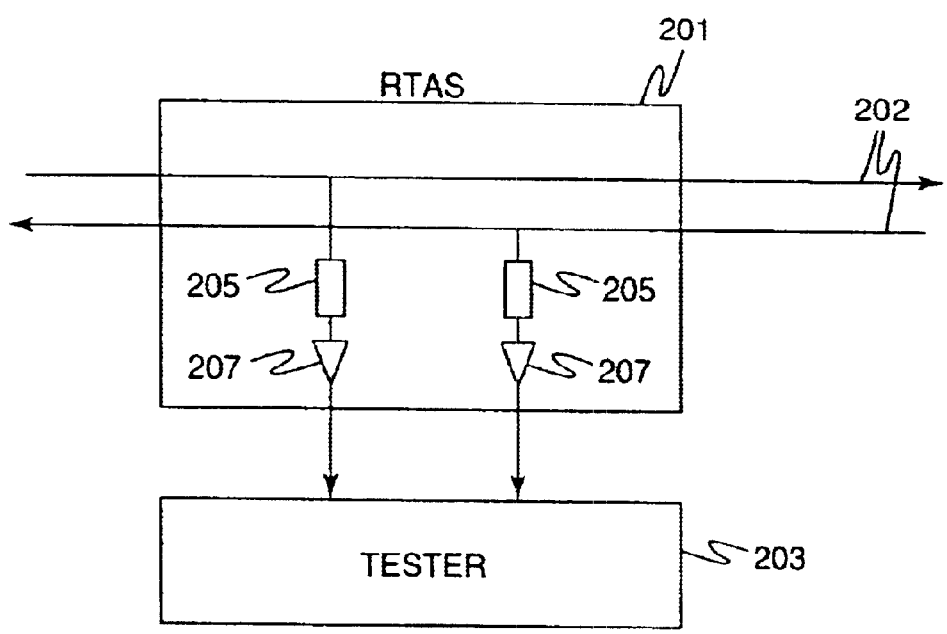

FIGS. 20–22 illustrate various connection configurations for facilitating non-intrusive monitoring of a number of telecommunication lines 202 using a remote test access system 201 of the present invention. The manner of connecting selected communication lines 202 between the remote test access system 201 and one or more testing devices 203 varies depending on a number of factors, including data rate, sensitivity of the particular testing device 203, and the distance between the test access system 201 and testing device 203.

With reference to FIG. 20, there is shown a remote test access system 201 through which a number of communication lines 202 pass using either or both of hardwired or patch connections as described above. Selected communication lines 201 may be connected to testing device 203 and subjected to non-intrusive monitoring and testing by testing device 203. In the embodiment of FIG. 20, bridging resistors 205 are coupled between selected communication lines 202 passing through test access system 201 and testing device 203. The value of the bridging resistors 205 is typically nine to ten times greater than the characteristic impedance of the communication line subject to testing.

The value of bridging resistors 205 should be sufficiently large to prevent the testing device 203 from interfering with the normal data flow on the communication line 202. It will be appreciated that in this configuration, bridging resistors 205 in conjunction with the input impendence of testing device 203, which is typically equivalent to the characteristic impedance of the communication line 202 subject to testing, will result in appreciable signal attenuation (e.g., –20 dB) at the point of monitoring. It is noted that certain testing devices 203 may not be capable of recovering highly attenuated signals for purposes of communication line testing.

Concerning the testing configuration shown in FIG. 21, the connection arrangement between test access system 201 and testing device 203 provides for 0 dB signal attenuation at the monitoring point. In this configuration, testing device 203 is required to provide a sufficiently high input impedance so as to avoid disrupting the normal flow of data on the communication line 202 subject to testing. In general, the connection between test access system 201 and testing device 203 should be very short. The testing configuration shown in FIG. 21 is best suited for relatively low data rates, such as DS-1 data rates, since a substantial degree of interference with normal data flow on the subject communication line 202 may result at relatively high data rates.

The testing configuration depicted in FIG. 22 provides for 0 dB signal attenuation at the monitoring point and minimal interference with the normal flow of data on the communication line 202 subject to testing. The testing configuration of FIG. 22 is particularly well-suited for monitoring of high data rate transmission lines 202 using testing devices 203 that may require, or prefer, line level signals for performing monitoring and/or testing functions. In accordance with the embodiment shown in FIG. 22, bridging resistors 205 are coupled between selected communication lines 202 passing through test access system 201 and testing device 203. As in the embodiment shown in FIG. 20, the value of bridging resistors 205 is sufficiently high so as not to cause interference with the normal flow of data on the communication line subject to testing, which results in appreciable signal attenuation at the monitoring point.

An amplifier 207 is coupled between each of the bridging resistors 205 and the corresponding input of testing device 203. Amplifiers 207 preferably increase the gain of the signal subject to testing to a level equivalent to offset the attenuation resulting from inclusion of bridging resistors 205 in the test signal path. Amplifiers 207 may include circuit elements that condition the signals subject to testing in a manner most appropriate for a given testing device 203. For example, amplifiers 207 may include filtering elements to minimize any phase distortion that may result from amplification of the signals attenuated by bridging resistors 205.

Although a preferred system and method embodying the present invention have been disclosed for illustrative purposes, those skilled in the art will appreciate that many additions, modifications and substitutions are possible without departing from the scope of the present invention. For example, a system has been described for providing testing access to DS-3 communication links. It is contemplated that the present invention may be utilized for other transmission rates and protocols, including the European E-3 protocol (34 Mbps) or STM-1 protocol (155 Mbps). It is further contemplated that the present invention may be utilized for substantially higher frequency signals, such as DS-5 signals which, in Europe, provide a capacity of 565.148 Mbps, as well signal rates on the order of 1 or more billion bits per second (Bbps). All such variations are intended to be within the scope of the invention as provided in the appended claims.

What is claimed is:

1. A system for accessing a plurality of communication lines by one or more testing devices, each of the plurality of communications lines coupled through the system and having a first termination at a first telecommunications termination site and a second termination at a second telecommunications termination site, the system comprising:

a plurality of line access devices, each of the line access devices coupled to at least one of the communication lines terminating at the first telecommunications termination site and at least one of the communication lines terminating at the second telecommunications termination site;

a plurality of relays defining a bus, one or more of the relays coupled to one of the line access devices;

a test device interface coupled to the bus, an activated one or more of the relays coupling a selected one of the communication lines to a selected one of the testing devices via the test device interface; and a patch circuit, provided in each of the line access devices, for manually establishing a cross-connection between a selected communication line terminating at one of the first or second telecommunications termination sites and the selected testing device or for manually establishing a connection between selected communication lines respectively terminating at the first and second telecommunications termination sites.

2. The system of claim 1, wherein each of the patch circuits provides local access to a communication line coupled to its corresponding line access device.

3. The system of claim 1, wherein each of the patch circuits comprises an input (IN) port and an output (OUT) port for manually establishing the cross-connection.

4. The system of claim 1, wherein each of the patch circuits comprises an input (IN) port, and output (OUT) port, and a monitor (MON) port.

5. The system of claim 4, wherein each of the input (IN) port, output (OUT) port, and monitor (MON) port comprises a jack-type connector.

6. The system of claim 1, wherein each of the patch circuits comprises an input (IN) port, output (OUT) port, and monitor (MON) port, and one or more visual indicators, a visual indicator associated with the monitor (MON) port of each of a pair of cross-connected line access devices illuminating in response to insertion of a patch connector into at least one of the respective monitor (MON) Ports.

7. The system of claim 1, wherein each of the line access cards comprises a switch circuit, a respective pair of patch and switch circuits of a line access card cooperating to provide connectivity between the selected testing device and equipment coupled to a selected communication line.

8. The system of claim 1, wherein the test device interface provides bi-directional connectivity between the selected communication line and a selected testing device.

9. The system of claim 1, wherein one or more signal paths defined as passing through the relays, test device interface, and a portion of the line access devices define untapped point-to-point connections.

10. The system of claim 1, wherein the communication lines comprise high speed digital transmission lines.

11. The system of claim 1, wherein the communication lines comprise high speed digital transmission lines characterized by transmission rates on the order of tens, hundreds or thousands of megabits per second (Mbps).

12. The system of claim 1, further comprising a chassis, wherein each of the line access devices and the test device interface are removably insertable into one of the plurality of slots provided in the chassis.

13. The system of claim 12, further comprising a control device and a communications device, wherein each of the control device and communications device is removably insertable into one of the plurality of slots provided in the chassis.

14. The system of claim 1, wherein each of the test device interfaces comprises one or more visual indicators for communicating operating status information.

15. The system of claim 1, wherein the test device interface comprises a test card, the test card comprising one or more visual indicators for communicating an operating status of the test device interface.

16. The system of claim 11, the test card comprises a front test card and a rear test card, the front test card comprising one or more visual indicators for communicating an operating status of the test device interface.

17. The system of claim 1, wherein each of the line access devices comprises a line card, each of the line cards comprising one or more visual indicators for communicating operating status information.

18. The system of claim 1, wherein each of the line access devices comprises a rear line card coupled to at least one of the communication lines and a front line card, the front line card providing control to a corresponding rear line card and comprising at least IN and OUT connection jacks coupled to the patch circuit.

19. The system of claim 1, wherein the system is operative in a digital signal cross-connect (DSX) environment.

20. The system of claim 1, further comprising bridging resistors coupled between the bus and the test device interface.

21. The system of claim 20, further comprising an amplifier coupled between each of the bridging resistors and the test device interface.

22. A system for providing access to a plurality of communication lines by one or more testing devices, comprising:

a control device coupled to, and controlling, the line access devices and the test device interface; and a plurality of line access devices, each of the line access devices coupled to at least one of the communication lines and including a patch circuit for establishing a cross-connection;

a test device interface;

a plurality of relays defining a bus, an activated one or more of the relays coupling a selected one of the communication lines to a selected one of the testing devices via the test device interface; and a communication device coupled to the control device, the communications device providing remote access to the system by a remote controlling device.

23. The system of claim 22, wherein the communication device provides communication of information between the system and the remote controlling device.

24. The system of claim 22, wherein the communications device provides communication of configuration or status information between the system and the remote controlling device.

25. The system of claim 22, wherein the remote controlling device comprises a computer or a terminal.

26. The system of claim 22, wherein the communications device provides communication of information between the system and the remote controlling device for testing the communication lines.

27. The system of claim 22, wherein each of the patch circuits comprises an input (IN) port and an output (OUT) port for manually establishing the cross-connection.

28. The system of claim 22, wherein each of the patch circuits comprises an input (IN) port, an output (OUT) port, and a monitor (MON) port.

29. The system of claim 28, wherein each of the input (IN) port, output (OUT) port, and monitor (MON) port comprises a jack-type connector.

30. A system for providing access to a plurality of communication lines by one or more testing devices, comprising:

a plurality of line access devices, each of the line access devices coupled to at least one of the communication lines and comprising a patch circuit for establishing a cross-connection;

a test device interface; and a plurality of relays defining a bus, an activated one or more of the relays coupling a selected one of the communication lines to a selected one of the testing devices via the test device interface, the relays, test device interface, and at least a portion of the line access devices exhibiting characteristics of an unbalanced transmission line having a characteristic impedance approximately equivalent to am impedance of the selected communication line.

31. The system of claim 30, where in or more signal paths defined as passing through the relays, test device interface, and the portion of the line access devices define untapped point-to-point connections.

32. The system of claim 30, wherein the characteristic impedance is approximately 75 ohm.

33. The system of claim 30, wherein one or more signal paths defined as passing through the relays, test device interface, and the portion of the lien access devices have a stripline configuration.

34. The system of claim 30, wherein one or more signal paths defined as passing through the relays, test device interface, and a portion of the line access devices are provided on or in a printed circuit board (PCB).

35. The system of claim 34, wherein the printed circuit board (PCB) comprises multiple layers within which one or more of the signal paths having a stripline configuration are provided.

36. The system of claim 30, wherein one or more signal paths defined as passing through the relays, test device, interface, and the portion of the line access devices comprise a signal conductor disposed between a plurality of reference planes.

37. The system of claim 36, further comprising first and second guard conductors respectively disposed on opposite sides of each of the signal conductors, the guard conductors coupled to the reference planes at predetermined locations and providing electromagnetic induction (EMI) shielding.

38. The system of claim 36, wherein pins of the connector are configured to include a signal conductor pin about which a plurality of shield conductor pins are situated.

39. The system of claim 36, wherein the connectors comprise DIN connectors.

40. The system of claim 30, wherein the system is selectively operative in a test mode and a loopback mode.

41. The system of claim 30, wherein the communication lines comprise high speed digital transmission lines characterized by transmission rates on the order of tens, hundreds or thousands of megabits per second (Mbps).

42. They system of claim 30, further comprising bridging resistors coupled between the bus and the test device interface.

43. The system of claim 42, further comprising an amplifier coupled between each of the bridging resistors and the test device interface.

44. A method of providing access to a plurality of communication lines by one or more testing devices, comprising:

selecting one of the plurality of communication lines;

selecting one of a plurality of testing device interface outputs;

establishing either a hardwired or temporary signal conductivity path between the selected communication line and the selected testing device interface output; and providing an information signal transmitted through the selected communication line to the selected testing device interface output for access by a testing device coupled to the selected testing device interface output; and wherein providing the information signal further comprises selectively providing the information signal to the selected testing device interface output or looping back the information signal to the selected communication line.

45. The method of claim 44, wherein establishing the signal conductivity path further comprises manually establishing the temporary signal conductivity path.

46. The method of claim 44, wherein establishing the signal conductivity path further comprises activating one or more relays that selectively couple and decouple one of the plurality of communication lines with the selected testing device interface output.

47. The method of claim 44, further comprising:

visually indicating a status of the selected communication line or a testing device coupled to the selected test device interface output.

48. The method of claim 44, wherein selecting one of the plurality of communication lines further comprises remotely selecting one of the plurality of communication lines.

49. The method of claim 44, wherein selecting one of the plurality of testing device interface outputs further comprises remotely selecting one of the plurality of testing device interface outputs.

50. The method of claim 44, further comprising:

attenuating the information signal prior to providing the information signal to the selected testing device interface output.

51. The method of claim 44, further comprising:

amplifying the attenuated information signal prior to providing the attenuated information signal to the selected testing device interface output.

* * * * *